US007485366B2

(12) United States Patent
Ma et al.

(10) Patent No.: US 7,485,366 B2
(45) Date of Patent: Feb. 3, 2009

(54) THICK FILM MAGNETIC NANOPARTICULATE COMPOSITES AND METHOD OF MANUFACTURE THEREOF

(75) Inventors: Xinqing Ma, Storrs, CT (US); Yide Zhang, Storrs, CT (US); Shihui Ge, Lanzhou (CN); Zongtao Zhang, Unionville, CT (US); Dajing Yan, Allen, TX (US); Danny T. Xiao, Willington, CT (US)

(73) Assignee: Inframat Corporation, Farmington, CT (US)

( * ) Notice: Subject to any disclaimer, the term of this patent is extended or adjusted under 35 U.S.C. 154(b) by 0 days.

(21) Appl. No.: 10/846,440

(22) Filed: May 14, 2004

(65) Prior Publication Data

US 2005/0074600 A1 Apr. 7, 2005

Related U.S. Application Data

(63) Continuation-in-part of application No. 10/731,682, filed on Dec. 9, 2003, now abandoned, which is a continuation of application No. 10/046,337, filed on Oct. 26, 2001, now Pat. No. 6,720,074.

(60) Provisional application No. 60/243,649, filed on Oct. 26, 2000.

(51) Int. Cl.
    B32B 5/66 (2006.01)
(52) U.S. Cl. .................. 428/403; 428/404; 428/405; 428/406; 428/407; 427/202; 427/216; 427/376.1; 427/376.2
(58) Field of Classification Search ................ 428/403, 428/404, 405, 406, 407; 427/202, 216, 376.1, 427/376.2
    See application file for complete search history.

(56) References Cited

U.S. PATENT DOCUMENTS

| 3,330,697 | A | 7/1967 | Pechini |
| 4,353,958 | A | 10/1982 | Kita et al. |
| 5,230,729 | A | 7/1993 | McCandlish et al. |
| 5,279,994 | A | 1/1994 | Kerkar |
| 5,667,716 | A | 9/1997 | Ziolo et al. |
| 5,952,040 | A | 9/1999 | Yadav et al. |
| 6,045,925 | A | 4/2000 | Klabunde et al. |
| 6,048,920 | A | 4/2000 | Ziolo et al. |
| 6,162,530 | A | 12/2000 | Xiao et al. |
| 6,447,848 | B1 | 9/2002 | Chow et al. |
| 6,720,074 | B2 * | 4/2004 | Zhang et al. ............. 428/842.4 |
| 6,773,765 | B1 | 8/2004 | Gambino et al. |
| 2005/0200438 | A1 | 9/2005 | Renaud et al. ................ 335/84 |

OTHER PUBLICATIONS

Leslie-Pelecky et al, "Magnetic Properties of NanoStructured Materials", Chem. Mater.199:1770-1783.*

Hayakawa et al., "High Resistive Nanocrystalline FE-M-O . . . " J.Appl. Phys. 81(8), Apr. 15, 1997; 3747-3752.*
H. Gleiter, Materials With Ultrafine Microstructures: Retrospectives and Perspectives, Nanostructured Materials, vol. 1, pp. 1-19, 1992.
C.G. Granqvist and R.A. Buhrman, "Ultrafine Metal Particles", Journal of Applied Physics, vol. 47, No. 5 pp. 2200-2219., May 1976.
D.L. Leslie-Pelecky, et al., "Self-Stabilized Magnetic Colloids: Ultrafine Co Particles in Polymers", Journal of Applied Physics, 79 (8), pp. 5312-5314, Apr. 15, 1996.
Y.D. Zhang, et al., "Nanocomposite Co/SiO2 Soft Magnetic Materials", IEEE Transactions on Magnetics, vol. 37, No. 4, pp. 2275-2277, Jul. 4, 2001.
J.P. Wang et al., "Preparation and Magnetic Properties of Fe100-xNix-SiO2 Granular Alloy Solid Using a Sol-Gel Method", Journal of Magnetism and Magnetic Materials, 135, pp. L251-L256, 1994.
D.E. Nikles, et al., "Protection of Fe Pigments with Amine-Quinone Polymers", IEEE Transactions of Magnetics, vol. 30, No. 6, pp. 4068-4070, Nov. 1994.
M.L. Lau, et al., "Synthesis of Nanocrystalline M50 Steel Powders by Cryomilling", NanoStructured Materials vol. 7, 847-856, 1996.
J.P. Partridge and P.R. Strutt, "Laser-Assisted Chemical and Morphological Modification of Metallic Substrates," SPIE 669 Laser Applications in Chemistry, 150-160, 1986.
T.D. Xiao, Y.D. Zhang, P.R. Strutt, J.I. Budnick, K. Mohan, and K.E. Gonsalves, "Synthesis of FexN/BN Magnetic Nanocomposite Via Chemical Processing," NanoStructured Materials, vol. 2, 285-294, 1993.
J. Smit and H.P.J. Wijn, Ferrites, (Philips', Holland, 1959).
P.R. Strutt, K.E. Gonsalves and T.D. Xiao, "Synthesis of Polymerized Preceramic Nanoparticle Powders by Laser Irradiation of Metallorganic Precursors," NanoStructued Materials, vol. 1, 21-25, 1992.
T.D. Xiao, S. Torban, P.R. Strutt and P.G. Klemens, "Synthesis of Si(N,C) Nanostructued Powders from an Organometallic Aerosol Using a Hot-Wall Reactor," Journal of Material Science 28, 1334-1340, 1993.
T.D. Xiao, S. Torban, P.R. Strutt and B. H. Kear, "Synthesis of Nanostructured Ni/Cr and Ni-Cr3C2 Powders by an Organic Solution Reaction Method," NanoStructured Materials, vol. 7, pp. 857-871, 1996.
T. D. Xiao, K.E. Gonsalves and P.R. Strutt, "Synthesis of Aluminum Nitride/Boron Nitride Composite Materials," J. Am. Ceram. Soc. 76, 987-92, 1993.
P. Luo, P.R. Strutt and T.D. Xiao, "Synthesis of Chromium Silicide-Silicon Carbide Composite Powder," Materials Science and Engineering, B17, 126-130, 1993.

(Continued)

Primary Examiner—Kiliman Leszek
(74) Attorney, Agent, or Firm—Cantor Colburn LLP

(57) ABSTRACT

Thick film magnetic/insulating nanocomposite materials, with significantly reduced core loss, and their manufacture are described. The insulator coated magnetic nanocomposite comprises one or more magnetic components, and an insulating component. The magnetic component comprises nanometer scale particles (about 1 to about 100 nanometers) coated by a thin-layered insulating phase. While the intergrain interaction between the immediate neighboring magnetic nanoparticles separated by the insulating phase provides the desired soft magnetic properties, the insulating material provides high resistivity, which reduces eddy current loss.

29 Claims, 22 Drawing Sheets

OTHER PUBLICATIONS

T.D. Xiao, Bokhimi, M. Benaissa, R. Perez, P.R. Strutt and M. JoséYacamán, "Microstructural Characteristics of Chemically Processed Manganese Oxide Nanofibres," Acta Mater. vol. 45, 1685-1693, 1997.

G.C. Hadjipanayis and G.A. Prinz, Science and Technology of Nanostructured Magnetic Materials, (Plenum Press, New York, 1991).

Y. Hayakawa, A. Makino, H. Fujimori and A. Inoue, "High resistive nanocrystalline Fe-M-O (M=Hf, Zr, rare-earth metals) soft magnetic films for high-frequency applications", J. Appl. Phys. 81, 3747-3752, 1997.

R.D. Shull, et al., Nanocomposite Magnetic Materials, Proc. 6th Int. Cryocooler Conf. (Eds: G. Green, M. Knox), David Taylor Research Center Publication #DTRC-91/002, Annapolis, MD 1991.

A.K. Giri, C. de Julian, and J. M. Gonzalez, "Coercivity of Fe-SiO2 Nanocomposite Materials Prepared by Ball Milling", J. Appl. Phys. 76, 6573-6575, 1994.

A. Goldman, Handbook of Modern Ferromagnetic Materials, (Kluwer Academic Publisher, Boston, 1999).

K.H. Kim, Y.H. Kim, J. Kim, S.H. Han, and H.J. Kim, "The Magnetic Properties of Nanocrystalline Fe-Co(Cr)-Hf-N thin films", Journal of Applied Physics, vol. 87, 5248-5250, 2000.

W.D. Jones, Fundamental Principles of Powder Metallurgy, p. 659, (E. Arnold, London, 1960).

G. Herzer, Soft Magnetic Nanocrystalline Materials, Scripta Metallurgica et Materialia, vol. 33, 1741-1756, 1995.

D.L. Leslie-Pelecky, and R.D. Rieke, Magnetic Properties of Nanostructured Materials, Chem. Mater. 8, 1770-1783, 1996.

G. T. Rado, On the Inertia of Oscillating Ferromagnetic Domain Walls, Physical Review, vol. 83, pp. 821-826. 1951.

G.T. Rado, "Magnetic Spectra of Ferrites", Reviews of Modern Physics, vol. 25, pp. 81-89, 1953.

H. Fujimori, Structure and 100 MHz Soft Magnetic Properties in Multilayers and Granular Thin Films, Scripta Metallurgica et Materialia, vol. 33, 1625-1636, 1995.

A. Chatterjee et al., Glass-Metal Nanocomposite Synthesis by Metal Organic Route, J. Phys. D: Appl. Phys. 22, 1386-1392, 1989.

D. N. Lambeth, et al., "Media for 10Gb/in2 Hard Disk Storage, Issues and Status", J. Appl. Phys. 79, 4496-4501, 1996.

C. Djega-Mariadassou, et al., "High Field Magnetic Study of Small Fe Particles Dispersed in an Alumina Matrix", IEEE Transactions on Magnetics, vol. 26, No. 5, pp. 1819-1821, Sep. 1990.

M. Pardavi-Horvath, et al., "Switching Field Distribution Changes During Reactions-Milling of Iron-Zinc Nanocomposites", IEEE Transactions on Magnetics, vol. 31, No. 6, pp. 3775-3777, Nov. 1995.

C. Laurent, et al., "Magnetic Properties of Granular Co-Polymer Thin Films", Journal of Applied Physics, 65 (5), pp. 2017-2020, Mar. 1, 1989.

G.A. Niklasson, et al., "Optical Properties and Solar Selectivity of Coevaporated Co-Al2O3 Composite Films", Journal of Applied Physics, 55 (9), pp. 3382-3410, May 1, 1984.

A. Gavrin, et al., "Fabrication and Magnetic Properties of Granular Alloys", Journal of Applied Physics, 67 (2), pp. 938-942, Jan. 15, 1990.

E. Paparazzo, et al., "X-ray Photoemission Study of Fe-Al2O3 Granular Thin Films", Rapid Communications Physical Review B, vol. 28, No. 2, pp. 1154-1157, Jul. 15, 1983.

J.I. Gittleman, et al., "Magnetic Properties of Granular Nickel Films", Physical Review B, vol. 5, No. 9, pp. 3609-3621, May 1, 1972.

J.I. Gittleman, et al., "Superparamagnetism and Relaxation Effects in Granular Ni-SiO2 and Ni-Al2O3 Films", Physical Review B, vol. 9, No. 9, pp. 3891-3897, May 1, 1974.

M. Pardavi-Horvath, et al., "Magnetic Properties of Copper-Magnetite Nanocomposites Prepared by Ball Milling", Journal of Applied Physics, 73 (10), pp. 6958-6960, May 15, 1993.

* cited by examiner

THICK FILM MAGNETIC NANOPARTICULATE COMPOSITES AND METHOD OF MANUFACTURE THEREOF

CROSS REFERENCE TO RELATED APPLICATION

This application is a Continuation-in-Part of U.S. patent application Ser. No. 10/731,682, filed on Dec. 9, 2003, now abandoned, which was a Continuation of U.S. patent application Ser. No. 10/046,337, filed on Oct. 26, 2001, now U.S. Pat. No. 6,720,074, which claimed the benefit of U.S. Provisional Patent Application Ser. No. 60/243,649, filed Oct. 26, 2000, all of which are fully incorporated herein by reference.

STATEMENT REGARDING FEDERALLY SPONSORED RESEARCH

The U.S. Government has certain rights to this invention pursuant to NASA contract NAS 3 00073 and Air Force contract F29601-02-C-0031.

BACKGROUND

The present disclosure relates to magnetic materials, and in particular to soft and hard magnetic materials. Soft magnetic materials may be useful as core materials of inductive components.

Inductive components used in electronic devices often require magnetic materials, which desirably exhibit high saturation magnetization, high initial permeability, high resistivity, low magnetic power loss, low eddy current loss, low dielectric power loss, high Curie temperature, variable temperature stability of magnetic and electrical properties, and good mechanical strength.

To date, high frequency magnetic components have employed ferrites as core materials. However, ferrites are limited in part by low permeabilities when compared to metallic materials, poor performance at frequencies greater than 100 MHz, low Curie temperatures, and complex manufacturing procedures. Currently, there is no method available for producing commercial-scale amounts of soft magnetic materials with properties superior to ferrites in the high frequency range (greater than 100 MHz).

Current methods for processing conventional micrometer-sized soft magnetic materials are designed to reduce the total core loss by reducing eddy current loss. Three types of soft magnetic materials are commonly used: metallic ribbons, powdered metals, and powdered ferrites. Metallic ribbon materials comprise Fe—Ni, Fe—Co, and Fe—Si alloys, manufactured in the form of stripes or ribbons using a metallurgy approach, and are used in the frequency range of 10 to 100 kHz. Powdered metal materials are composites consisting of a metallic magnetic phase (Fe, Co, or their various alloys) and a non-magnetic insulating phase. This type of material is made by powder metallurgy techniques and is used in the frequency range of 50 kHz to 500 kHz. Ferrites include materials such as spinel ferrites (e.g., (Ni, Zn)Fe$_2$O$_4$), hexagonal ferrites (e.g., Me$_2$Z, wherein Z=Ba$_3$Me$_2$Fe$_{24}$O, and Me denotes a transition metal element), and garnet ferrites (e.g., Y$_3$Fe$_5$O$_{12}$). Ferrites are made by ceramic techniques, and are used in the frequency range from 100 kHz to 100 GHz.

There are a number of disadvantages associated with currently available soft magnetic materials. In conventional micrometer-sized soft magnetic materials, each particle or grain contains many magnetic domains ("multidomain"), which cause interference or resonance. Domain wall resonance restricts the frequency characteristics of the initial permeability. When the size of the magnetic particle is smaller than the critical size for multidomain formation, the particle is in a single domain state. With single magnetic domain particles, domain wall resonance is eliminated, and the material can function at higher frequencies.

None of the three types of magnetic materials meet all of the above-mentioned requirements in soft magnetic applications owing to their associated large core loss. Metallic ribbon materials have excellent fundamental magnetic properties such as high saturation magnetization, high initial permeability, and high Curie temperature. However, a low resistivity ($10^{-6}$ Ohm-cm) renders them difficult to use at frequencies above 1 MHz. In addition, the mechanical strength of the ribbons is very poor. Powder metals have higher resistivities and, consequently, can be used at higher frequency ranges, but their permeabilities are low. Ferrites are the only practical choice when the working frequency for a device is above 1 MHz, but the magnetic properties of ferrites in the high frequency range are poor. Although extensive efforts have been directed toward improving the performance of these materials, very limited progress has been made.

To date, there appears to be no prior art relating to the use of nanostructured materials in bulk soft magnetic applications. As used herein, nanostructured materials have grains or particles with average dimensions of 1 nanometer to 100 nanometers (nm). A feature of nanostructured materials is the high fraction of atoms (up to 50%) that reside at grain or particle boundaries. Such materials have substantially different, often superior, chemical and physical properties compared to conventional micrometer-sized counterparts of the same composition.

A variety of methods have been developed to produce nanostructured materials, for example production by condensation from the vapor phase. This inert gas condensation methodology has been developed by Nanophase Technologies to produce TiO$_2$ and Al$_2$O$_3$ in commercial-scale quantities. Another technique for making nanostructured metal and ceramic powders is by mechanical milling at ambient or at liquid nitrogen (cryomilling) temperature. A third approach is chemical synthesis from inorganic or organic precursors, which has been used to produce nanostructured WC/C.

Recently, nanostructured FeMO$_x$ (wherein M is Hf, Zr, Si, Al or a rare-earth metal element) thin films have been obtained by Hadjipanayis et al and Hayakawa et al, via atomic deposition. These are nanostructured composite thin films deposited on substrates, where the thin film is composed of nanostructured magnetic particles surrounded by an amorphous insulating phase. However, the atomic deposition approach is limited to thin film applications, and is not suitable for bulk materials or thick films.

Fe/silica nanostructured composites have been proposed for use in magnetic refrigeration applications. The nanostructured composites are a mixture of iron particles with silica ceramic, but such composites are limited to magnetic refrigeration, and cannot be used for high frequency magnetic applications. Preparation of magnetic nanostructured composites using a wet chemical synthesis technique has been described for a Fe$_n$/BN composite by the ammonolysis of an aqueous mixture solution of FeCl$_3$, urea, and boric acid, followed by thermochemical conversion to the final product. While the synthesis of other magnetic nanostructured composite systems have been described, none of these materials is suitable for high frequency soft magnetic applications requiring reduced core loss. There accordingly remains a need for compositions and methods for large-scale manufacture of soft magnetic materials, especially bulk materials useful above about 1 MHz.

SUMMARY

The above-described drawbacks and disadvantages are overcome or alleviated by a thick magnetic/insulator film comprising magnetic particles, wherein each magnetic particle is surrounded by an insulating layer, wherein the magnetic particles have average dimensions of about 1 to about 100 nanometers, and wherein the thick film has a thickness of about 1 micrometer to about 3 millimeters.

In another embodiment, a method of forming a thick magnetic/insulator film comprises agglomerating magnetic particles having average dimensions of about 1 to about 100 nanometers, and an insulating component to form an agglomerated feedstock; and spraying the agglomerated feedstock onto a substrate to form the thick film having a thickness of about 1 micrometer to about 3 millimeters.

In another embodiment, a method of forming a thick magnetic/insulator film comprises preparing a precursor solution comprising a magnetic material precursor and an insulating material precursor, delivering the precursor solution to a substrate using a solution delivery system, and converting the precursor solution to a thick film, wherein the thick film comprises magnetic particles having average dimensions of about 1 nanometer to about 100 nanometers, and wherein the thick film has a thickness of about 50 micrometers to about 3 millimeters.

A three component nanocomposite comprises coated magnetic particles embedded in a matrix, wherein the coating is a substantially continuous coating having an average thickness of less than or equal to about 35 nanometers, and wherein the magnetic particles have grain sizes with average dimensions of about 1 to 100 nanometers.

BRIEF DESCRIPTION OF THE DRAWINGS

Referring now to the Figures, which are exemplary embodiments, and wherein the like elements are numbered alike.

DETAILED DESCRIPTION OF THE PREFERRED EMBODIMENTS

The terms "a" and "an" herein do not denote a limitation of quantity, but rather denote the presence of at least one of the referenced item.

Figure 1:
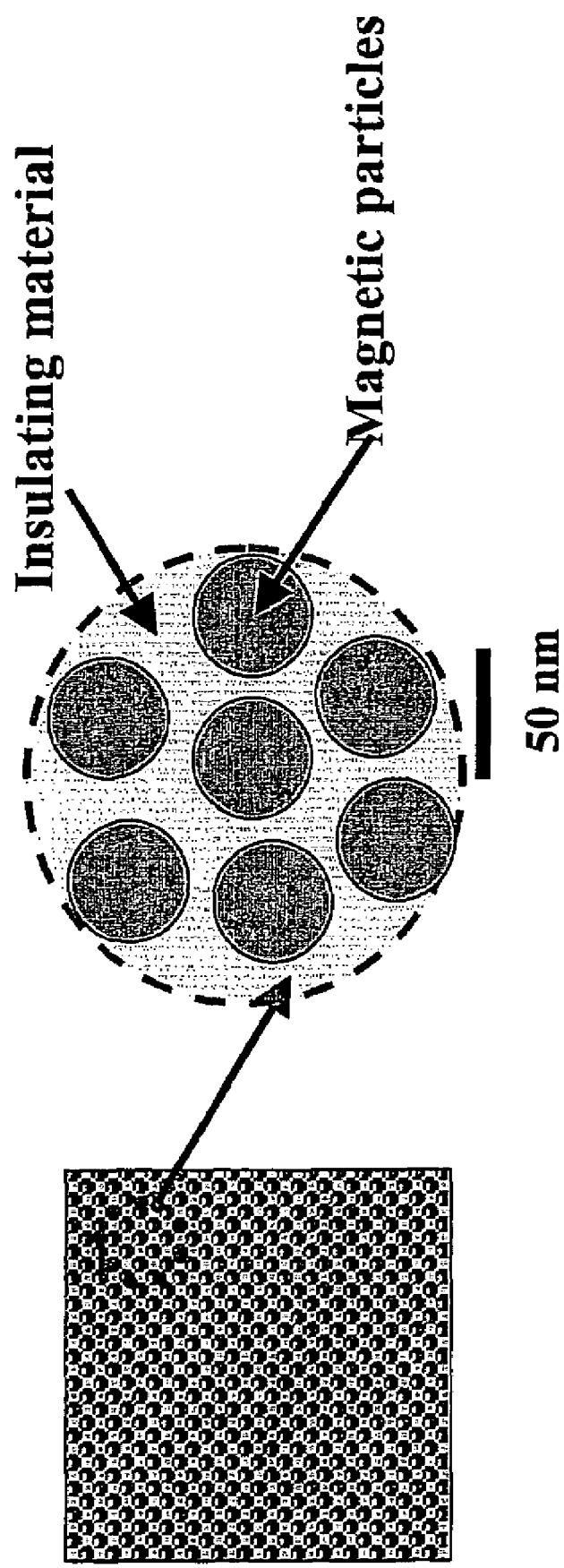
FIG. 1 is a schematic illustration of a metal/insulator nanostructured composite material.

A novel magnetic/insulator nanostructured composite material comprises nanostructured magnetic particles embedded in an insulating material as shown in FIG. 1. Specifically, magnetic particles with maximum dimensions of about 1 to about 100 nanometers (nm) are embedded in the insulating material such that the magnetic particle-particle separation is about 0.5 nm to about 100 nm. The composite materials may desirably be in the form of thick magnetic nanocomposite films. As used herein, the term "thick film" refers to a film having a thickness of about 1 micrometer to about 3 millimeters. In another embodiment, the thick films may have a thickness of about 10 micrometers to about 1 millimeter.

Figure 22:
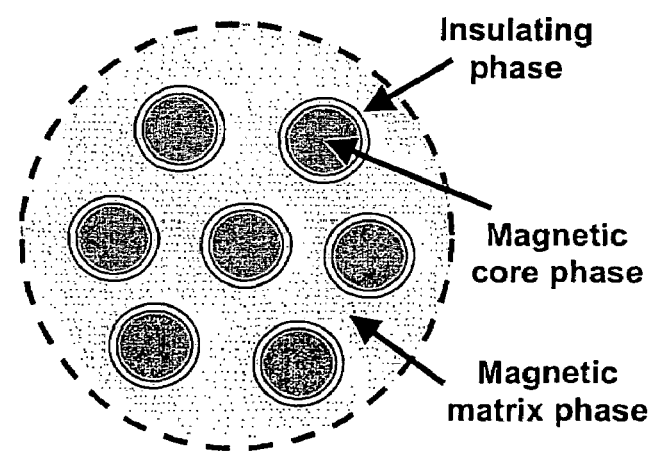
FIG. 22 is a schematic representation of a three-component nanocomposite having a magnetic core particle coated by an insulating phase and embedded in another phase.

In another embodiment, the composite is a three component nanocomposite comprising coated magnetic particles embedded in a matrix component, as shown schematically in FIG. 22. The magnetic particles have maximum dimensions of about 1 to about 100 nm. The coating is a substantially continuous coating having a thickness of less than or equal to about 35 nanometers. By substantially continuous it is meant that the magnetic particle is completely covered with no significant interruptions in the coating. The matrix can be magnetic, insulating, or a combination thereof. The three component nanocomposites may be in the form of bulk materials, or thick films.

In part, because nanostructured materials are formed from nanometer-sized building blocks that are on the order of $10^9$ times smaller than the volume of traditional bulk materials, replacing commercially used ferrite cores with the high performance magnetic nanostructured composites disclosed herein results in inductive components that are lighter, smaller, more economical, and more durable, contributing greatly to improved performance in high frequency devices, as well as in microwave antenna and rectenna applications. Furthermore, the composite materials have a more uniform mechanical structure, with high strength, ductility and hardness, as well as larger resistance to fracture, deformation, wear, and corrosion. The mechanical properties of the composite material may be dependent on the uniformity of its nanostructure. Improved structural properties do not conflict, and in many cases are even consistent, with improved magnetic and electric properties. Therefore, the thick films may have a combination of desirable magnetic, electric, and mechanical properties.

The materials may be ferromagnetic and optionally may be soft or hard magnetic composites. As used herein, "hard" magnetic materials are those with a magnetization (magnitude and direction) that is difficult to change by application of an external magnetic field. For hard magnetic materials, permeability is less than about 10 and coercivity is greater than about 1000 Oersteds (Oe). Also as used herein, "soft" magnetic materials are those where the magnetization (magnitude and direction) can more easily be changed by application of an external magnetic field. For soft magnetic materials, the permeability is about $10^2$ to about $10^5$, while the coercivity is less than about 10 to about $10^{-3}$ Oe.

Suitable soft magnetic materials include but are not limited to compositions having at least one magnetic component, for example transition metals such as Fe, Co, Ni, Mn, and Zn; transition metal intermetallic alloys such as Fe—Ni, Fe—Co, Co—Ni, Fe—B, Fe—N, Fe—Zr, Fe—Si, Fe—Si—B, Fe—Zr—B, Fe—P—B, Mn—Zn, and Ni—Zn; and transition metal-rare earth alloys, such as Fe—Nb, Fe—Sm, and the like, and combinations comprising one or more of the foregoing magnetic materials. Desirable soft magnetic materials include, for example, Ni—Zn alloys. Suitable insulating phase materials are high dielectric materials, including amorphous or crystalline ceramics such as alumina, silica, zirconia, and the like, and high dielectric polymers and polymer composites. As used herein, high dielectric materials are those with a dielectric constant greater than or equal to about 5. The insulating phase components can be either nonmagnetic or magnetic (such as ferrite) materials, as well as combinations comprising one or more of the foregoing materials.

Specific composites for the thick films include, for example, Ni—Zn-ferrite, Ni—Zn-ferrite/$SiO_2$, and combinations comprising one or more of the foregoing composites.

In one embodiment, a three-component nanocomposite comprises (Fe/$SiO_2$)/Ni-ferrite formed from $SiO_2$-coated Fe particles as the magnetic materials embedded in Ni-ferrite (the insulating material). The Ni-ferrite component serves as a second insulating material, and simultaneously as a magnetic material because it has a very high electric resistance and magnetic saturation at high frequency. Since the Fe/$SiO_2$ nanocomposite particles are separated by the insulating material, the electrical resistance may be high. This "nano-sandwich", three-component structure has many advantages. First, the $SiO_2$ film may shield Fe from oxidation. Second, the $SiO_2$ coating may be a magnetic coupling bridge between the dispersed Fe and the Ni-ferrite. Third, the nanostructured-$SiO_2$ coating may act as reaction and diffusion barrier to prevent diffusion and chemical reaction between the Fe and Ni-ferrite. Fourth, it is convenient to adjust the volume fraction of Fe in the (Fe/$SiO_2$)/Ni-ferrite nanocomposite, since the magnetic and electrical properties can be tailored by adjusting the volume fraction. Fifth, this structure can be obtained by a three-dimensional densification method at room temperature.

The thick films may be applied to a substrate by thermal spray techniques including, for example, thermal spray using a powdered feedstock, and solution precursor plasma spray. Thermal spray techniques include coating processes in which a coating is applied to a substrate by deposition of materials in a molten or semi-molten state. Thermal spray may be performed with a detonation gun, a plasma gun, or a high velocity oxygen fuel (HVOF) gun.

In the HVOF spray process, nanometer-sized magnetic particles are desirably used as starting materials for reconstitution of sprayable feedstock via a spray dry process. The substrate may optionally be prepared by degreasing and coarsening by sand blasting. A high velocity flame is generated by combustion of a mixture of fuel (e.g., propylene) and oxygen. The enthalpy and temperature can be adjusted by using different fuels, different fuel-to-oxygen ratios, and/or different total fuel/oxygen flow rates. The nature of the flame may be adjusted according to the ratio of fuel to oxygen. Thus, an oxygen-rich, neutral or fuel-rich flame can be produced. The feedstock is fed into the flame at a controlled feed rate via, for example, a co-axial powder port, melted and impacted on the target substrate to form a deposit/film. The film thickness may be controlled by the number of coating passes. The resultant films are optionally heat treated with an annealing step.

In the plasma spray process, nanometer-sized magnetic particles may be used as starting materials for the reconstitution of sprayable feedstock via a spray dry process. The substrate may optionally be prepared by degreasing and coarsening by sand blasting. A plasma arc is a source of heat that ionizes a gas, which melts the coating materials and propels it to the work piece. Suitable gases include, for example, argon, nitrogen, hydrogen, and the like. Plasma settings, which may be varied, include current, voltage, working gases and their flow rates. Other process parameters include standoff distance, powder feed rate, and gun movements. Optimal conditions may be identified for each of the parameters without undue experimentation by one ordinarily skilled in the art. Film thickness may be controlled based on the number of coating passes. The resultant films are optionally heat treated with an annealing step.

Feedstock preparation for thermal spray techniques including HVOF and plasma spray may involve the formation of micron-sized agglomerates containing individual nanoparticles and an insulating material. The agglomerates are preferably substantially spherical, micron-sized granules containing agglomerated nanoparticles. Individual nanoparticles cannot be readily thermally sprayed directly owing to their fine size and low mass. Agglomeration of the nanoparticles to form micron-sized granules allows for formation of a suitable feedstock. Formation of the feedstock may comprise dispersion (e.g., by ultrasound) of the nanoparticles into a liquid medium; addition of a binder to form a solution; spray drying of the solution into agglomerated particles; and heating the agglomerated particles to remove organic binders and to promote powder densification.

In organic-based liquid media, the binder may comprise about 5% to about 15% by weight, and preferably about 10% by weight, of paraffin dissolved in a suitable organic solvent. Suitable organic solvents include, for example, hexane, pentane, toluene and the like, and combinations comprising one or more of the foregoing solvents. In aqueous liquid media, the binder may comprise an emulsion of polyvinyl alcohol (PVA), polyvinylpyrrolidone (PVP), carboxymethyl cellulose (CMC), another water soluble polymer, or a combination comprising one or more of the foregoing polymers, formed in de-ionized water. The binder may be present in an amount of about 0.5% to about 5% by weight of the total solution, and preferably from about 1% to about 10% by weight of the total aqueous solution. In one embodiment, the binder is CMC.

Magnetic thick films up to several hundred microns, and even several millimeters, thick may be produced in the solution precursor plasma spray process. The solution precursors may be fed into a plasma torch to deposit a thick film.

The precursor plasma spray process is described in more detail in U.S. Pat. No. 6,447,848, incorporated herein by reference. In the thermal spray process of forming the thick films from precursor solutions, three steps may be specifically involved: (1) preparing the precursor solution comprising a magnetic material precursor and an insulating material precursor; (2) delivering the precursor solution using a solution delivery system; and (3) converting the precursor solution into a solid material by a pyrolysis reaction. The solution delivery system is used to drive the solution from a reservoir to a liquid injection nozzle that generates droplets with a size and velocity sufficient for their penetration into the core of a flame. The liquid flow rate and injection are controllable. Delivery of the solution typically comprises spraying of the solution into a chamber, onto the target substrate, or into a flame directed at the substrate. The substrate may be optionally heated. The resultant films may be optionally heat treated with an annealing procedure.

The precursor solution is formed from at least one precursor salt dissolved in a solvent or a combination of solvents. Exemplary salts include, but are not limited to, carboxylate salts, acetate salts, nitrate salts, chloride salts, alkoxide salts, butoxide salts and the like, and combinations comprising one or more of the foregoing salts; with alkali metals, alkaline earth metals, transition metals, rare earth metals, and the like, and combinations comprising one or more of the foregoing metals, as well as combinations of the foregoing salts and metals. Precursors may also be in the form of inorganic silanes such as, for example, tetraethoxysilane (TEOS), tetramethoxysilane (TMOS), and the like, and combinations comprising one or more of the foregoing silanes. Exemplary solvents in which the salts may be dissolved include, but are not limited to, water, alcohols, acetone, methyl ethyl ketone, and combinations comprising one or more of the foregoing solvents. In the case of magnetic/insulator composites, the reagents are weighed according to the desired stoichiometry of the final compound and then added and mixed into a liquid medium. The precursor solution may be heated and stirred to dissolve the solid components and to homogenize the solution Coating may be conveniently accomplished using an aqueous solution reaction of metal and ceramic precursors, for example. An apparatus suitable to produce the nanostructured composite powders includes a reaction vessel equipped with a pH meter, temperature controller, hot plates and/or spray drier. Suitable process steps for the synthesis of metal/insulator nanostructured composite include precursor preparation; precomposite fabrication; nanostructured composite formation; and surface passivation.

The use of precursors allows uniform mixing of the constituent elements at the molecular level. Low temperature annealing of the precursors facilitates the formation of a thin, insulating layer coated on the surfaces of magnetic particles. Specific aspects of this process may include (1) the addition of a glucose diluent in the precursor preparation step, (2) formation of a precomposite, (3) controlling particle size of the magnetic phase at elevated temperature in a gaseous environment, and (4) formation of an amorphous layer at the magnetic particle surface. The material then has no overall electric conductivity, and the eddy current produced within the particle is extremely small at high frequency up to the GHz frequency band.

In one embodiment of the solution precursor plasma spray, plasma spray may be accomplished in a manner to produce a particular microstructure of the thick film. The material produced by this method may comprise splats having an average dimension of less than or equal to about 2 micrometers. Additionally the splats may desirably have a thickness of less than or equal to about 800 nm. All splats in the material may be less than about 5 micrometers in dimension. The material may be highly dense, specifically greater than about 95% of the theoretical density.

The solution plasma spray method employed to produce the above-described microstructure comprises injecting precursor solution droplets into a thermal spray flame, wherein a first portion of the precursor solution droplets are injected into a hot zone of the flame, and a second portion of the precursor solution droplets are injected into a cool zone of the flame; fragmenting the droplets of the first portion to form reduced size droplets, and pyrolizing the reduced size droplets to form pyrolized particles in the hot zone; at least partially melting the pyrolized particles in the hot zone; depositing the at least partially melted pyrolized particles on the substrate; fragmenting at least part of the second portion of precursor solution droplets to form smaller droplets and forming non-liquid material from the smaller droplets; and depositing the non-liquid material on the substrate. The substrate may be optionally preheated and/or maintained at a desired temperature during deposition. As readily understood by one of ordinary skill in the art, the terms first portion and second portion do not imply a sequential order but are merely used to differentiate the two portions.

Once formed, the thick films may be consolidated into fully dense components. Hot pressing procedures may be used to consolidate nanocomposite thick films.

Figure 2:
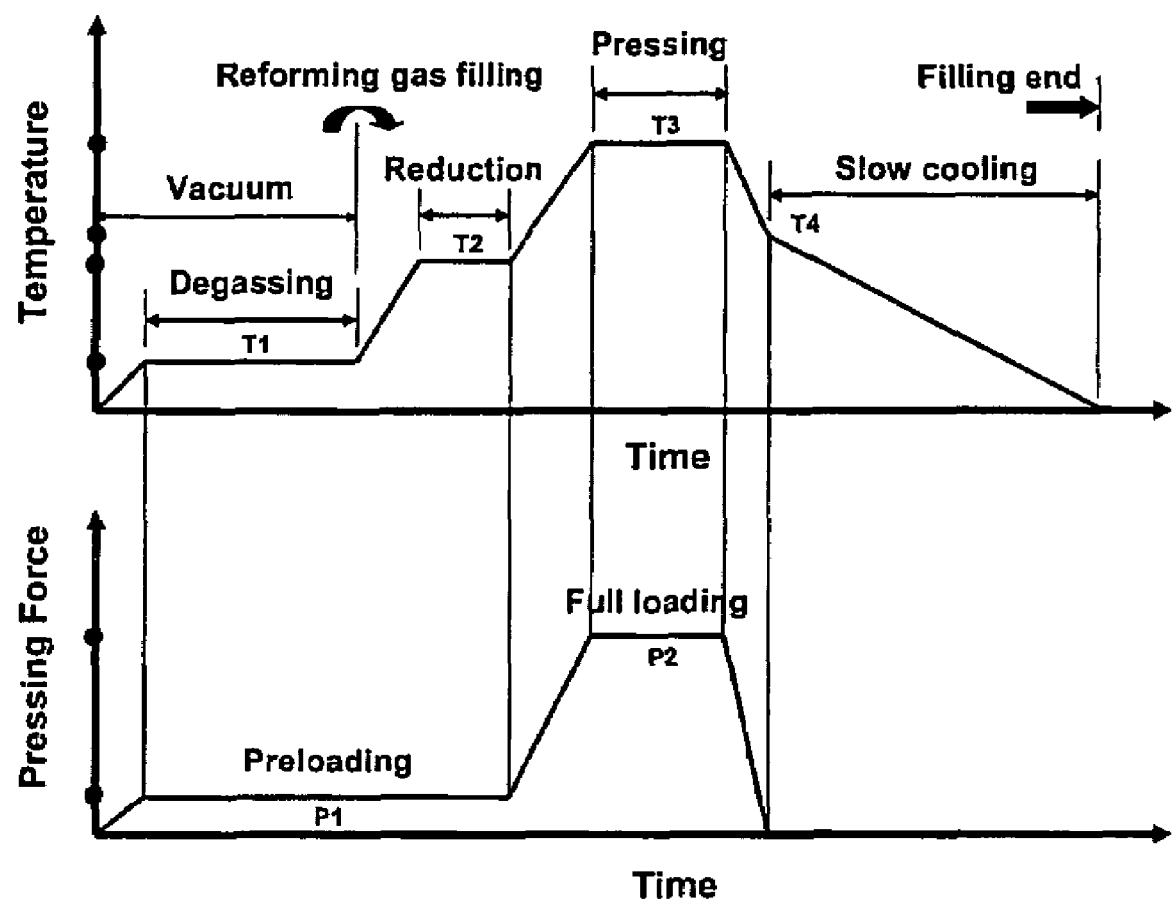
FIG. 2 is a schematic illustration of temperature and pressing force profiles for hot pressing.

In addition, the as-prepared nanocomposites may be passivated during formation. During the passivation process, a thin oxide layer is formed on the surface of the metal particles. This layer is preferably removed in the consolidation process, or afterward. A technique to remove this oxide layer before hot pressing by using forming gas (a non-explosive hydrogen gas and inert gas mixture) during the hot press process has been developed. A schematic of temperature and pressure profiles which may be used in the hot pressing procedure are schematically shown in FIG. 2.

The hot pressing procedure may thus involve degassing the chamber in which the material is to be treated, reducing surface oxides on the material, hot pressing the material, and slow cooling of the material. During degassing, the test chamber, die and powders may be vacuum outgassed at T1 (desirably 250° C.) for 3-16 hours to evaporate moisture and absorbed gases. During the holding time, a load of about 100 pounds (lbs) may be imposed. The surface oxides may be released by adding the forming gas to the chamber. For example, the forming gas may be backfilled into the chamber to reduce the thin passivating oxide film grown on the surface of the magnetic particles. T2 may vary for example, between about 350 to about 420° C., for NiFe/$SiO_2$ & Co/$SiO_2$. Hot pressing may be performed for 30 minutes at about 400° C. to about 800° C. in a forming gas atmosphere under a compressive stress of about 80 to about 150 MPa. The forming gas pressure may be slightly higher than 1 atmosphere during hot pressing to alleviate the oxidation of the powders from any air in-leakage. After rapid cooling (20° C./min) from hot pressing T3 to a low T4, preferably about 400 to about 500° C., slow cooling at about 2° C./min may be maintained until ambient temperature is reached, to reduce thermal stresses in the consolidated sample.

In a particularly advantageous feature, such magnetic materials may be manufactured in the bulk phase in large quantities. Consolidation of bulk magnetic materials is conveniently accomplished using known powder metallurgy processing techniques and equipment, for example ball mills or powder mixers, forming dies, presses, and high temperature sintering furnaces. Suitable process steps for the formation of consolidated bulk magnetic/insulator nanostructured composites are preparation of ready-to-press powders; consolidation of the ready-to-press powder into a green compact; component shape fabrication; and low temperature annealing. In the solution precursor plasma spray method, nanostructured particles are synthesized from precursors, coated with an insulating layer, and then consolidated into bulk-size magnetic composites. This method provides the opportunity for large quantity production, as well as access to different shapes such as toroids, plates, beads, rods, and the like.

Using this process, Co/$SiO_2$ and Fe—Ni/$SiO_2$ nanostructured composites with various volume fractions of the Co and Fe—Ni with respect to $SiO_2$ may be manufactured. Co/polymer, Fe/$NiFe_2O_4$, and Fe/$SiO_2$ nanocomposite materials may also be synthesized using chemical approaches. These nanostructured composites may be thoroughly characterized and consolidated into toroidal cores.

The magnetic/insulating nanostructured composites are suitable for use in many applications where soft magnetic materials are currently used. In particular, the following soft magnetic materials application categories may be targeted: (i) high or low power applications, such as for example power transformers, pulse transformers, filters, chocks, inductors and linear transformers; (ii) linear applications, (iii) microwave applications, such as antennae, rectennae and circulators; (iii) magnetic fluids; and (iv) refrigeration applications.

Without being bound by theory, it is hypothesized that the magnetic/insulator nanostructured composites take advantage of exchange coupling, a quantum mechanical effect that takes place only in nanostructured magnetic particles. Consequently, the composites exhibit novel magnetic properties. Because they consist of two or more constituents, there are more degrees of freedom available to independently adjust the magnetic, electric, thermal and mechanical properties of the materials. The as-formed nanostructured composite may therefore be adjusted to be electrically insulating without changing its magnetic behavior. Another advantage of the method is that compared to traditional metallurgical processing, which involves melting, rolling, cutting, wrapping and heat treatment, the present self-assembly and final shape formation procedures used for the fabrication of the nanostructured composites are more economical.

The invention is further illustrated by the following non-limiting examples.

EXAMPLES

Example 1

Synthesis of Co/$SiO_2$ (50:50 Volume %) Nanostructured Composite

Co (50 vol.%)—$SiO_2$ (50 vol. %) composite was formed from: 16.0 g TEOS, 64.2 g cobalt acetate (Co(OOCCH$_3$) 2.2H$_2$O), 40.0 g glucose ($C_6H_{12}O_6$), and 160 ml ethanol.

Precursor preparation: TEOS, cobalt acetate, and glucose were dissolved in ethanol. This solution was stirred for about 5 hours to obtain a homogenous precursor solution.

Precomposite powder preparation: The precursor solution was then converted into a precomposite powder using an evaporation method. This was accomplished by heating the precursor solution at about 120 to about 150° C. with vigorous stirring to prevent precipitation of any elements. In commercial-scale quantity production, this step may be accomplished by a spray conversion technique using a spray dryer.

Conversion of the precomposite into a Co/$SiO_2$ nanostructured composite: The precomposite powder was then transferred to an environmental furnace (modified Thermolyne). The powder was first heated to 500° C. in open air for 0.5 hours. The purpose of this heat treatment was to calcine the precomposite powder. After the calcination, Co and Si were present as amorphous oxides, namely, CoO and $SiO_2$. The oxide forms of the precomposite were then converted into a Co/$SiO_2$ nanostructured composite under a reducing atmosphere in $H_2$. The system was then purged and $H_2$ gas was introduced after the oxidation reaction at 500° C. The conversion experiments were performed at temperatures varying from about 300 to about 900° C. for 5 hours ($H_2$ flow of 2 liters/min). All temperatures produced Co/$SiO_2$ nanostructured composite powders. It was found that the annealing temperature is an important factor in determining the magnetic properties of the Co/$SiO_2$ nanocomposite.

Surface passivation: Although the Co nanostructured particles are coated with a thin film of $SiO_2$, the $SiO_2$ film is very porous, which permits the diffusion of oxygen molecules into the surface of Co. The synthetic Co/$SiO_2$ is extremely pyrophoric owing to its nanostructure, and will spontaneously oxidize to form oxide powders when exposed to air. To overcome this problem, the particle surface was passivated after the hydrogen reduction was complete. In one approach, the system was purged with $N_2$ gas for 20 minutes to de-activate the Co surface. The system was then cooled down in $N_2$. Before exposure to air, droplets of mineral oil were sprinkled onto the powder surface with enough time allowed for oil diffusion, while the reactor was purged with $N_2$. Excess oil was then washed off with hexane.

Example 2

Synthesis of Co/SiO$_2$ Nanostructured Composite Powders With Varying Co Volume Fraction Using the same procedure described in Example 1, Co/SiO$_2$ nanostructured composites were prepared with varying Co volume fractions. Only the cobalt acetate to TEOS ratios were varied to obtain 40 vol %, 60 vol %, 70 vol %, 80 vol %, and 90 vol % Co in the Co/SiO$_2$ nanostructured composites.

Example 3

Characterization of Co/SiO$_2$ Nanostructured Composite Powders

A. Structural Properties of Co/SiO$_2$ Nanocomposite Powder

Figure 3:
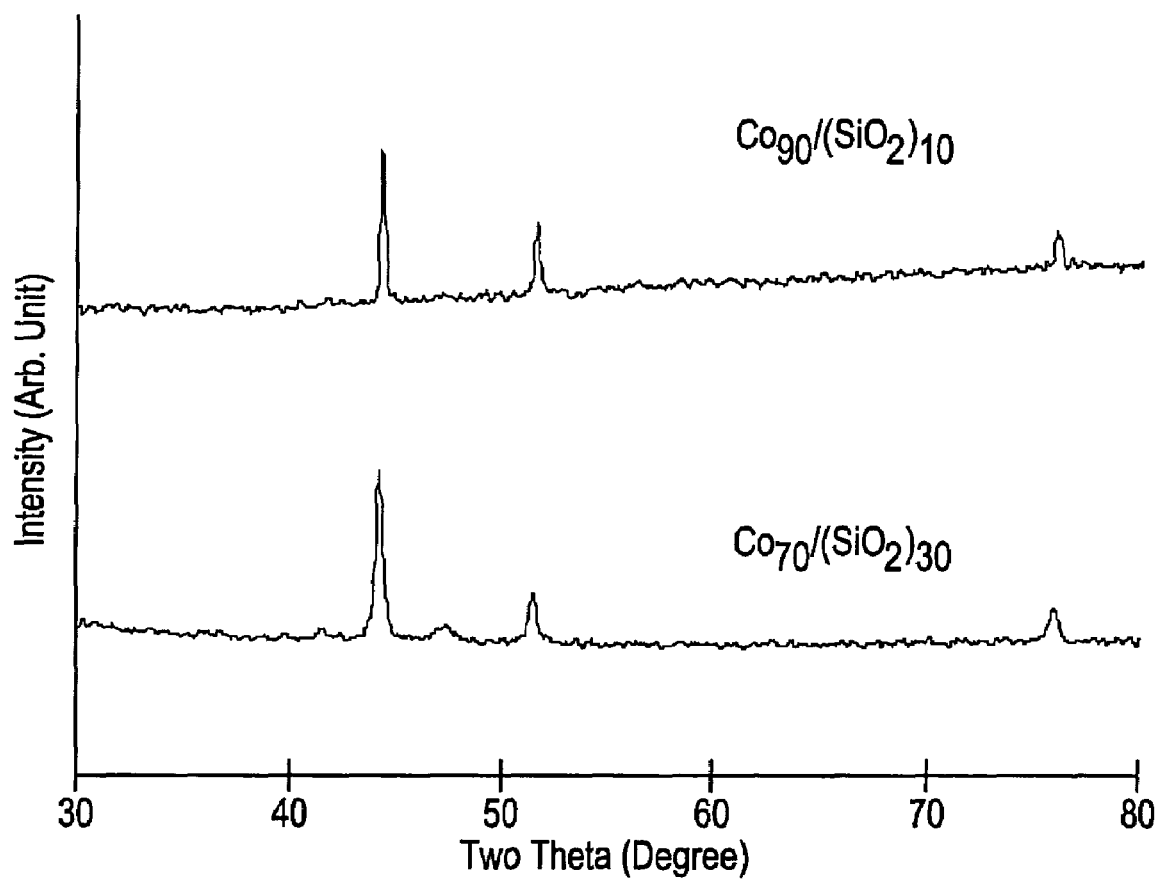
FIG. 3 illustrates powder X-ray diffraction (XRD) patterns for face-centered cubic (fcc) $Co_{70}/(SiO_2)_{30}$ and $Co_{90}/(SiO_2)_{10}$ nanocomposites.
Figure 4:
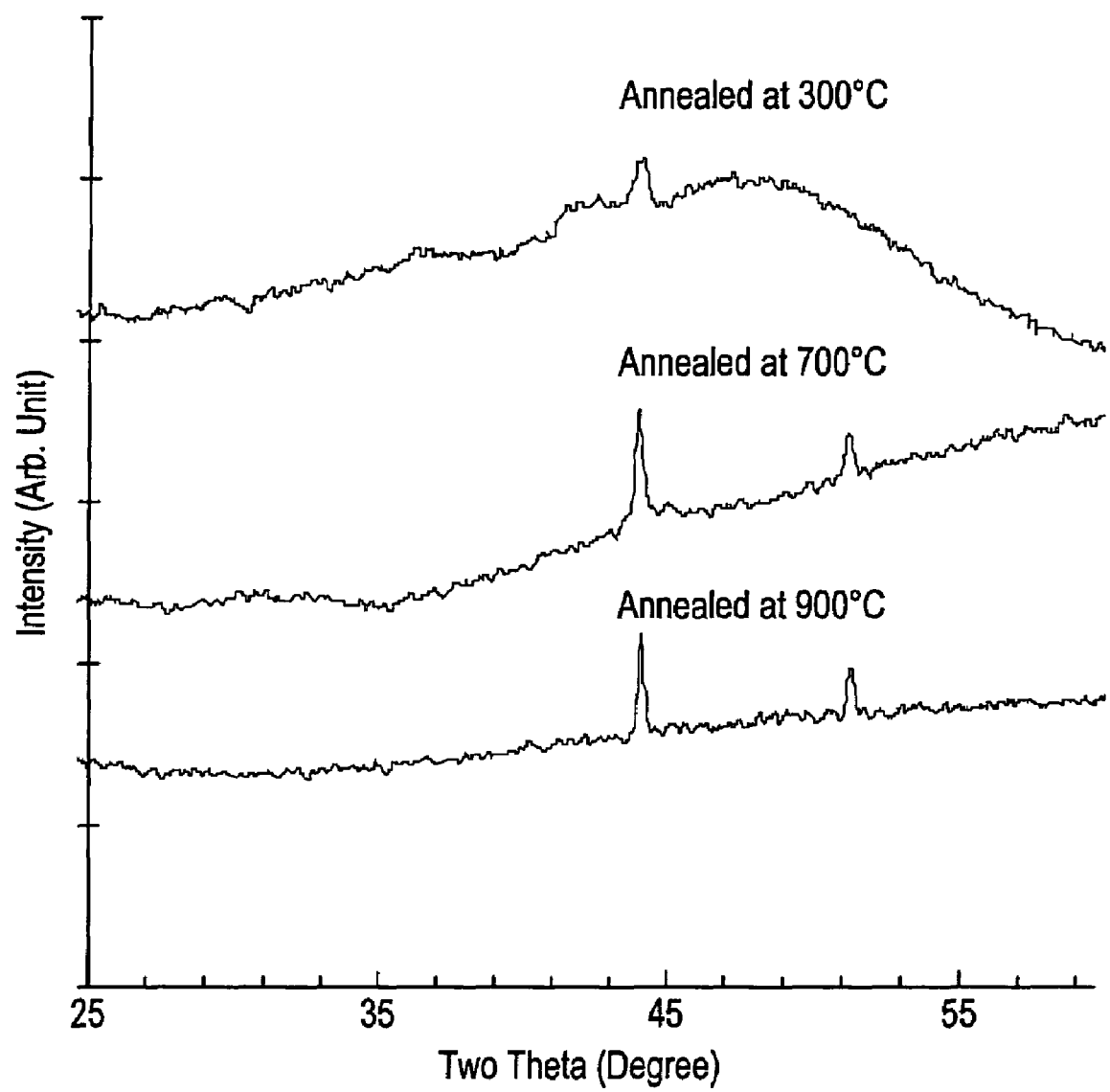
FIG. 4 illustrates XRD patterns of the $Co_{50}/(SiO_2)_{50}$ nanocomposite annealed at different temperatures under $H_2$.

Powder X-ray diffraction (XRD): In order to exhibit soft magnetic properties, the Co particles desirably crystallize in a face-centered cubic (fcc) structure. FIG. 3 shows XRD patterns for $Co_{70}/(SiO_2)_{30}$ and $Co_{90}/(SiO_2)_{10}$ nanocomposite particles. The XRD patterns indicated only the fcc Co phase, with a strong amorphous background owing to the presence of an amorphous silica phase. FIG. 4 shows the XRD pattern for $Co_{50}/(SiO_2)_{50}$ samples obtained by annealing the precomposites in $H_2$ at various temperatures. Only the fcc Co phase was evidenced for all temperatures. There were no diffraction peaks for SiO$_2$. Preliminary evaluation of Co particle size using X-ray peak broadening and the Scherrer equation revealed that the average Co grain size is about 30 nm, with no significant temperature dependent changes in average grain size.

Figure 5:
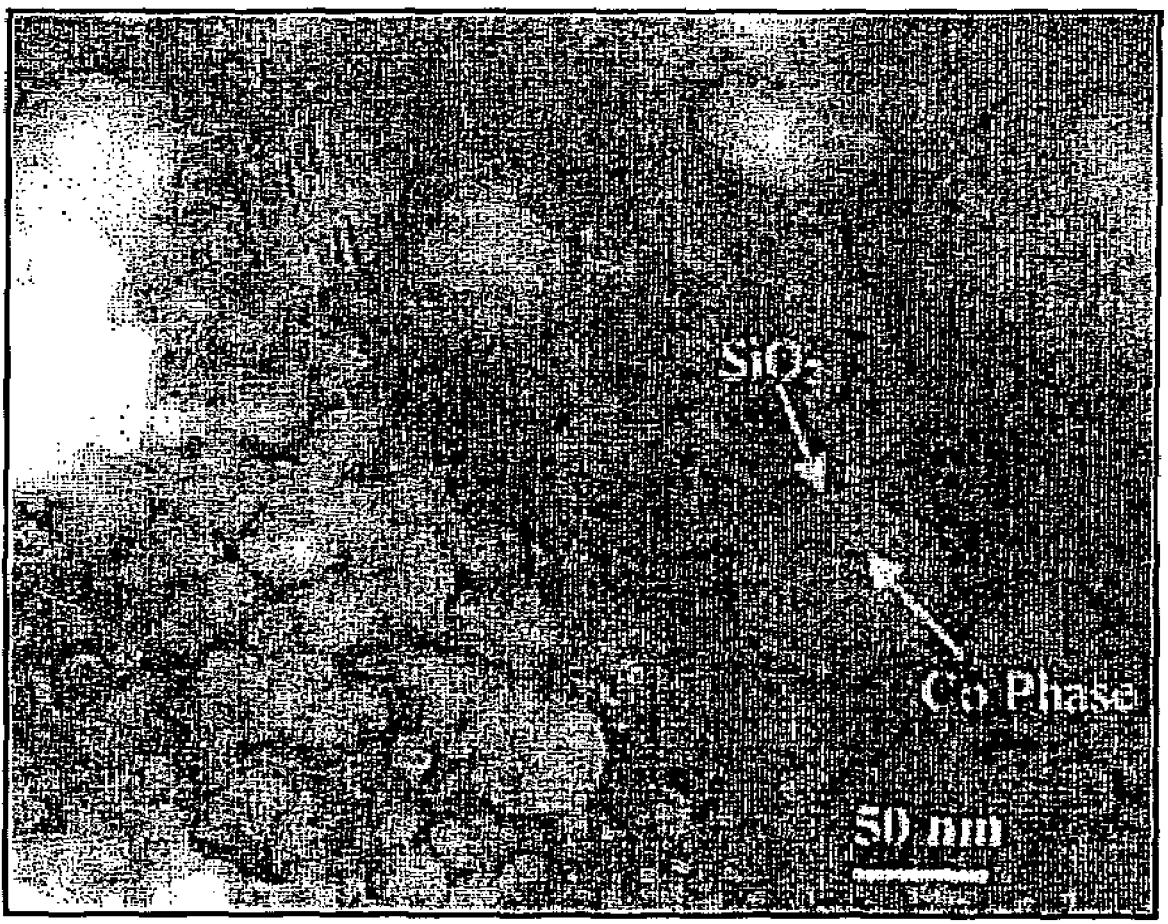
FIG. 5 is a transmission electron microscope (TEM) micrograph showing a two-phase material wherein amorphous $SiO_2$ films coat the surface of Co nanocrystals.

Transmission electron microscopy (TEM): A TEM bright field image for the synthesized $Co_{50}/(SiO_2)_{50}$ nanocomposite is shown in FIG. 5. TEM revealed that the synthetic nanostructured composite was a two-phase material, where nanostructured particles of Co are coated with silica. The Co phase had an average particle size of about 30 nm using. Selected area electron diffraction (SAED) experiments indicated that the Co particles fcc nanocrystals, where the silica phase was amorphous.

Figure 6A:
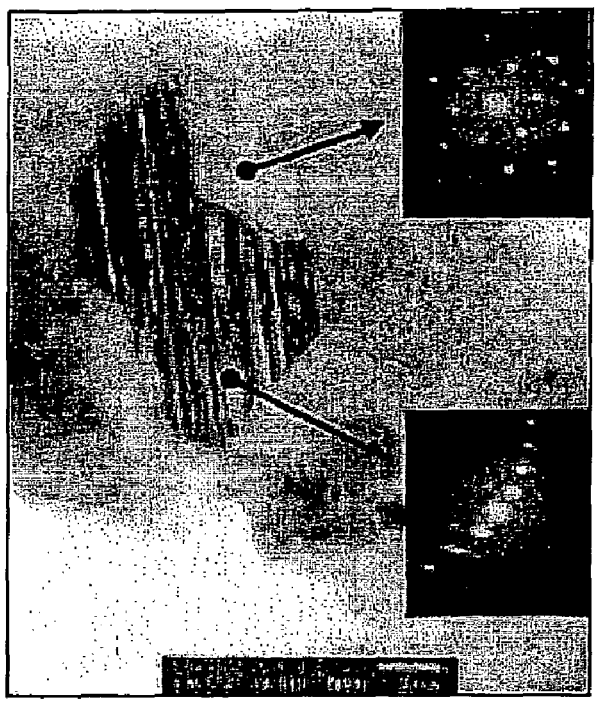
FIG. 6 is (a) a TEM image with microbeam diffraction showing local regions of microstructure of (1) [110] alpha-$SiO_2$, and (2) fcc [111] Co, and (b) a TEM image showing the interface between Co and $SiO_2$ including dislocations.
Figure 6B:
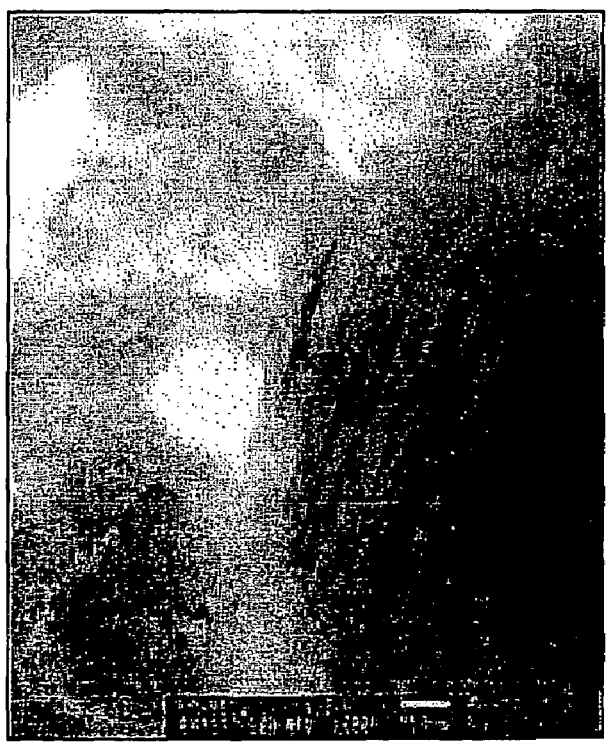

In order to understand the microstructure in detail at the nanometer level, localized regions at the Co/silica interface were studied using a microbeam diffraction technique. The diffraction beam was reduced to approximately 10 nm in size and diffracted at the area of interest. Two phases were found in localized regions, including fcc Co and γ-phase SiO$_2$, as shown in FIG. 6a. It should be noted here that the majority of the SiO$_2$ coating was amorphous, as indicated by the XRD and SAED results. Many twinned crystallites were observed inside the Co nanostructured particles. High resolution TEM (HRTEM) also revealed the existence of few dislocations in the interface between fcc Co and amorphous SiO$_2$ coating, as shown in FIG. 6b.

Figure 7:
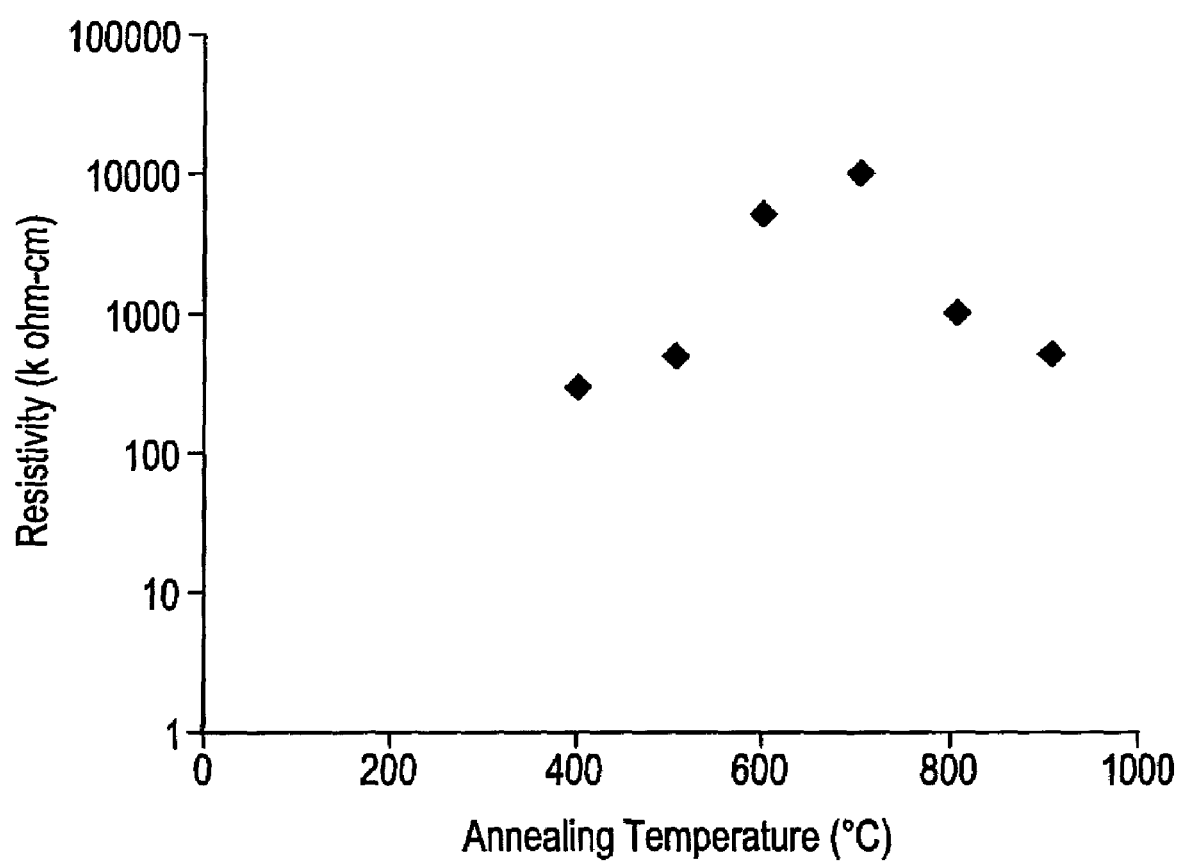
FIG. 7 is a graphical representation of resistivity as a function of annealing temperature for a $Co/SiO_2$ nanocomposite.

Resistivity of the Co/SiO$_2$ nanocomposite powder: The synthesized powder was pressed into a pellet using a hydraulic press. Plate electrodes were pressed on both surfaces of the disc, and the electrical resistance was measured. From the area and the thickness of the pellet, the resistivity of the sample was obtained. FIG. 7 shows the variation in resistivity of $Co_{50}(SiO_2)_{50}$ as a function of annealing temperature. As evidenced, for a sample annealed at about 700° C., its resistivity was as high as $10^7$ Ω-cm, which was $10^{13}$ times greater than that of metallic alloys and was 10 times greater than that of ferrites. The resistivity of the Co/SiO$_2$ nanocomposite was dependent on the synthesis conditions, especially on the annealing temperature. When the annealing temperature was too high, SiO$_2$ may have gradually crystallized to form separate particles instead of continuously coating the Co particles, resulting in a dramatic decrease in resistivity.

Figure 8A:
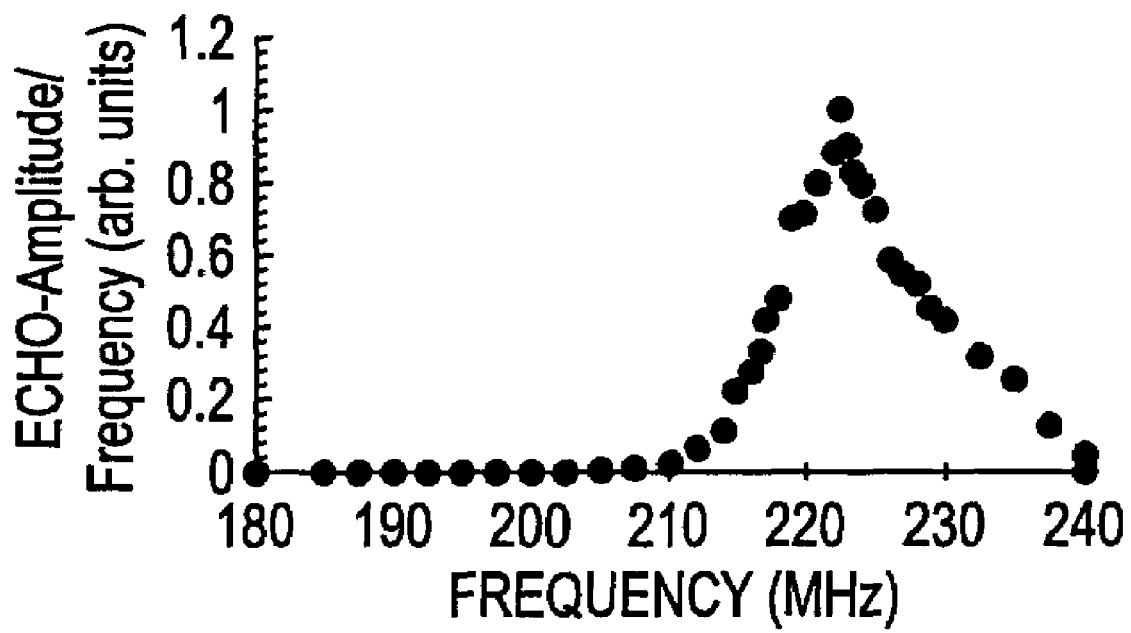
FIG. 8 is a $^{59}Co$ nuclear magnetic resonance (NMR) spectrum of a $Co/(SiO_2)$ nanocomposite annealed at (a) 400° C. and (b) 900° C.
Figure 8B:
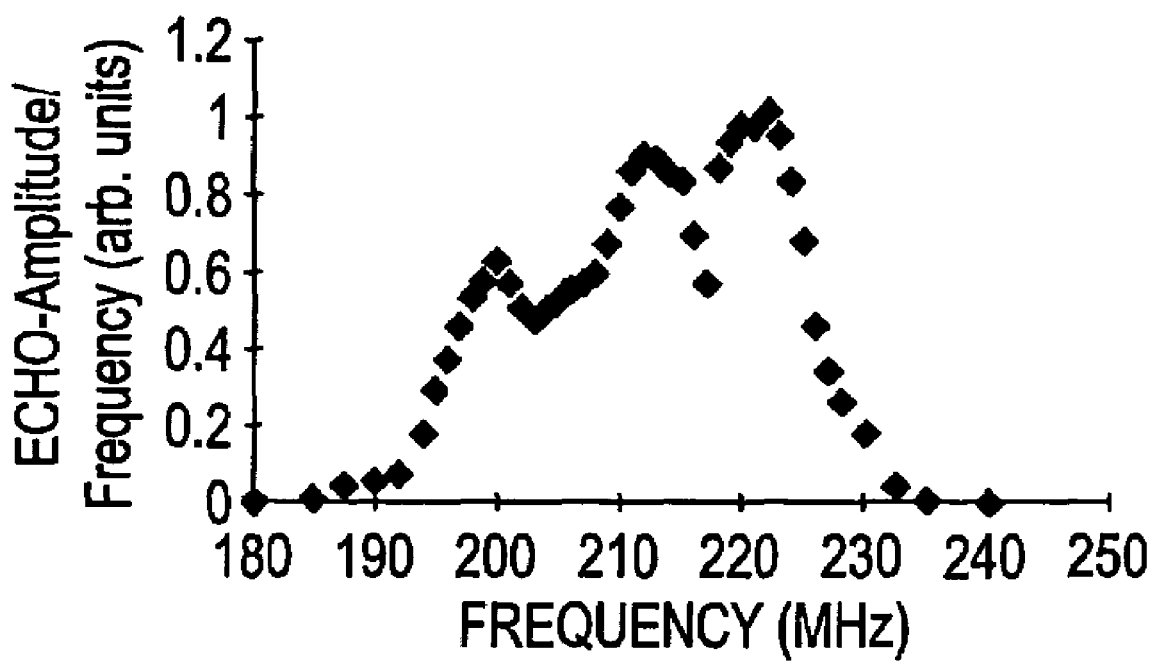

Nuclear magnetic resonance (NMR) experiments. $^{59}$Co spin-echo NMR experiments were carried out at 4.2 K using a Matec 7700 NMR. FIGS. 8a and 8b show the $^{59}$Co NMR spectra of $Co_{50}/(SiO_2)_{50}$ nanocomposite annealed at 400° C. and 900° C., respectively. For the sample annealed at 400° C., the NMR spectrum consisted of a single peak centered at 223 MHz. This indicated that the Co particles were smaller than 75 nm and were single domain. The very broad spectrum is also an indication of the size of the particle. For the sample annealed at 900° C., instead of a peak at 223 MHz, there were two satellite peaks centered at 211 and 199 MHz, which corresponded to the Co atoms having 1 and 2 Si atoms, respectively, as nearest neighbors. This demonstrates that Si entered the Co lattice when annealing was performed at temperatures greater than 900° C.

These experiments verified that the size of the as-synthesized Co/SiO$_2$ particles, and their crystalline and magnetic structures met the requirements for a soft magnetic material. In the preparation of Co/SiO$_2$ particles, the final annealing step was determined to be an important step. The chemical reaction process should be fully completed so as to reduce all of the Co into metallic Co. From this consideration, a higher annealing temperature might be favored. On the other hand, however, it was necessary to avoid Si atoms entering the Co lattice as the existence of the non-magnetic Si atoms in a Co particle resulted in inferior magnetic properties. Based on these experiments, the best annealing temperature of Co/SiO$_2$ appeared to be about 700° C.

B. Static Magnetic Properties of Co/SiO$_2$ Nanocomposite Powder

Figure 9:
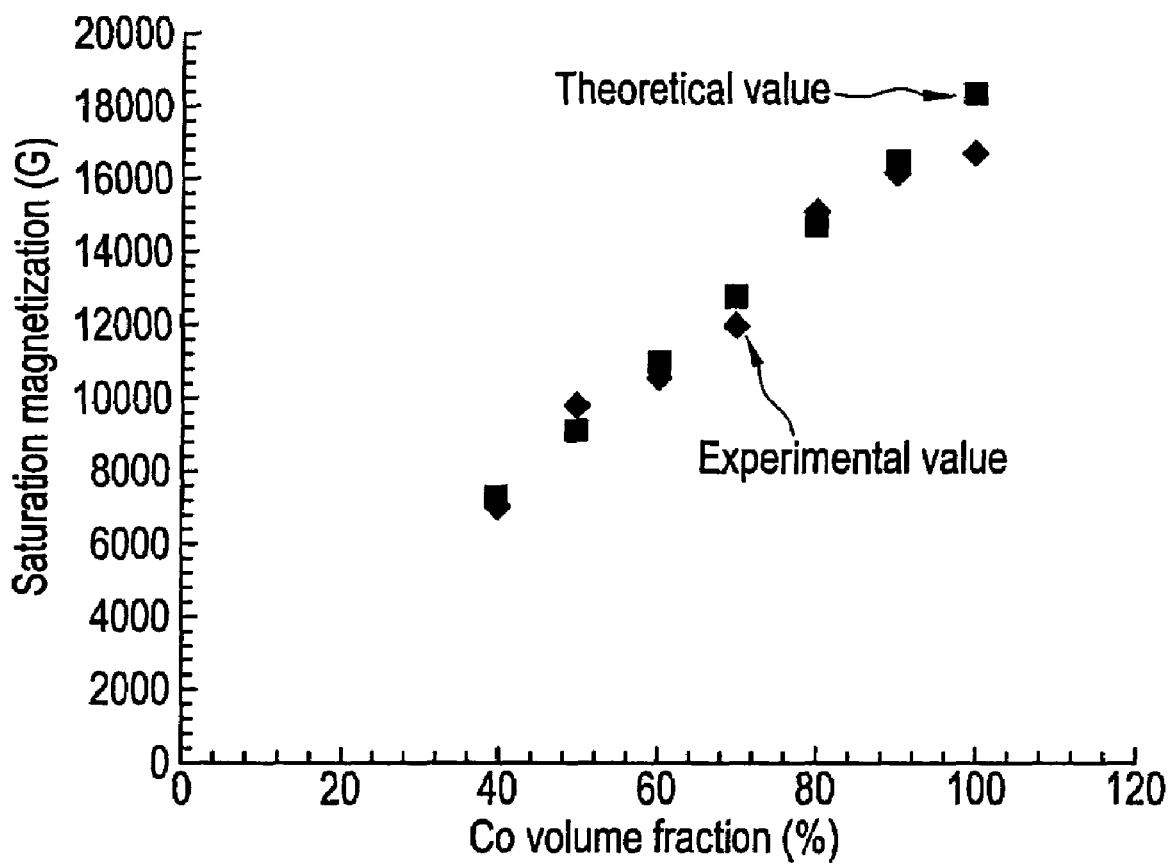
FIG. 9 is a graphical representation of the saturation magnetization of $Co_x/(SiO_2)_{100-x}$ for experimental (diamonds) and theoretical (squares) volume fraction, x.

A Quantum Design superconducting quantum interference device (SQUID) magnetometer was employed to characterize the static magnetic properties of the synthetic $Co_x/(SiO_2)_{100-x}$ nanocomposite at 10 K and 300 K. FIG. 9 shows the saturation magnetization of $Co_x/(SiO_2)_{100-x}$ as a function of the Co volume fraction. The solid diamonds represent the measured saturation magnetization for each Co volume fraction, and the squares represent the theoretical calculation. The very good consistency between the measured value and the calculated value indicated that the syntheses were complete.

Figure 10:
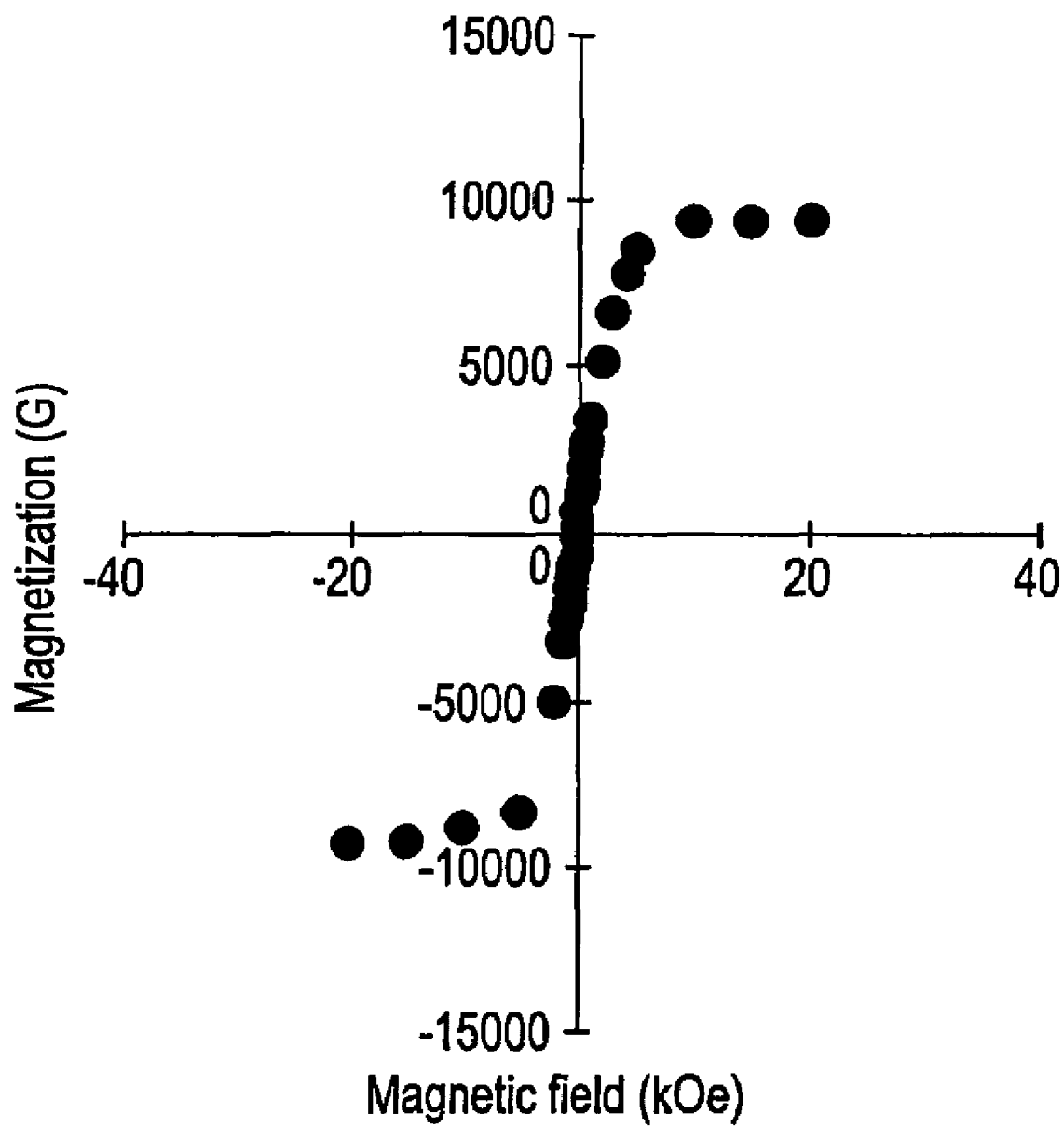
FIG. 10 is a graphical representation depicting the room temperature hysteresis loop for a $Co/SiO_2$ nanocomposite annealed at 700° C. in hydrogen.
Figure 11:
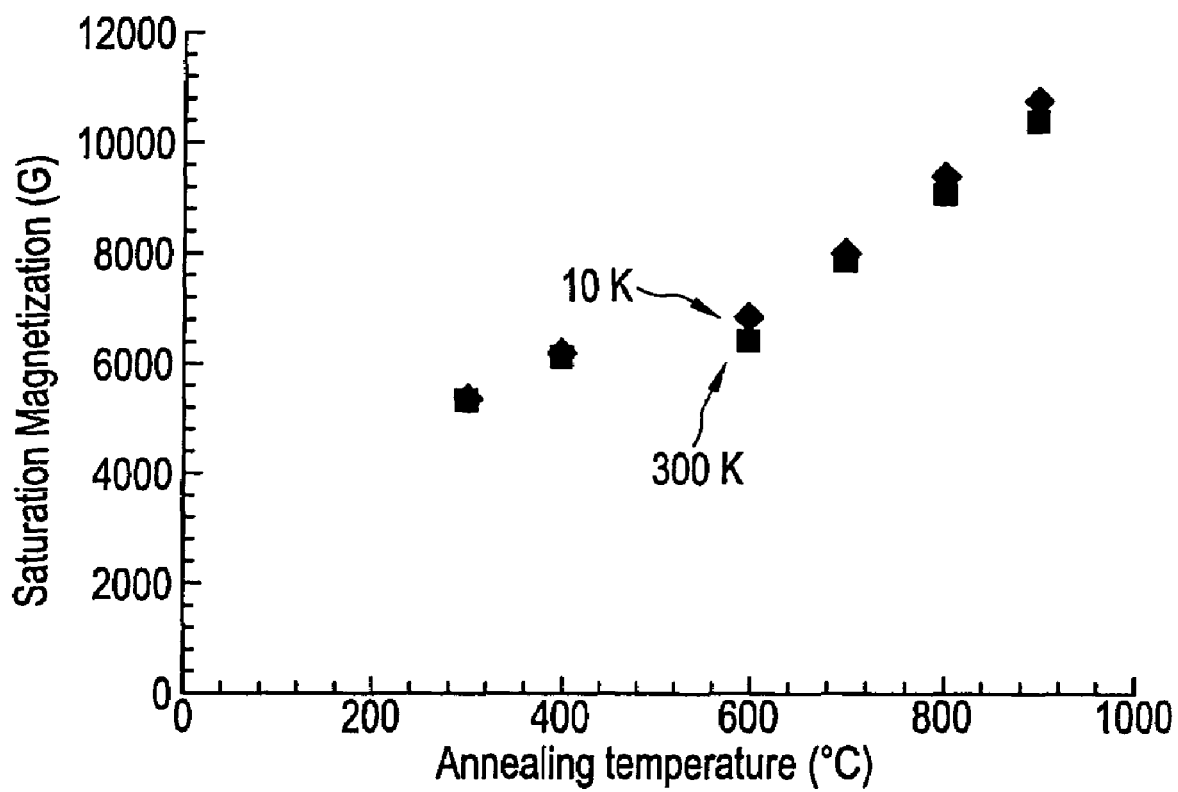
FIG. 11 is a graphical representation of the saturation magnetization for a $Co/SiO_2$ nanocomposite measured at 10K (diamonds) and 300K (squares) as a function of annealing temperature.
Figure 12:
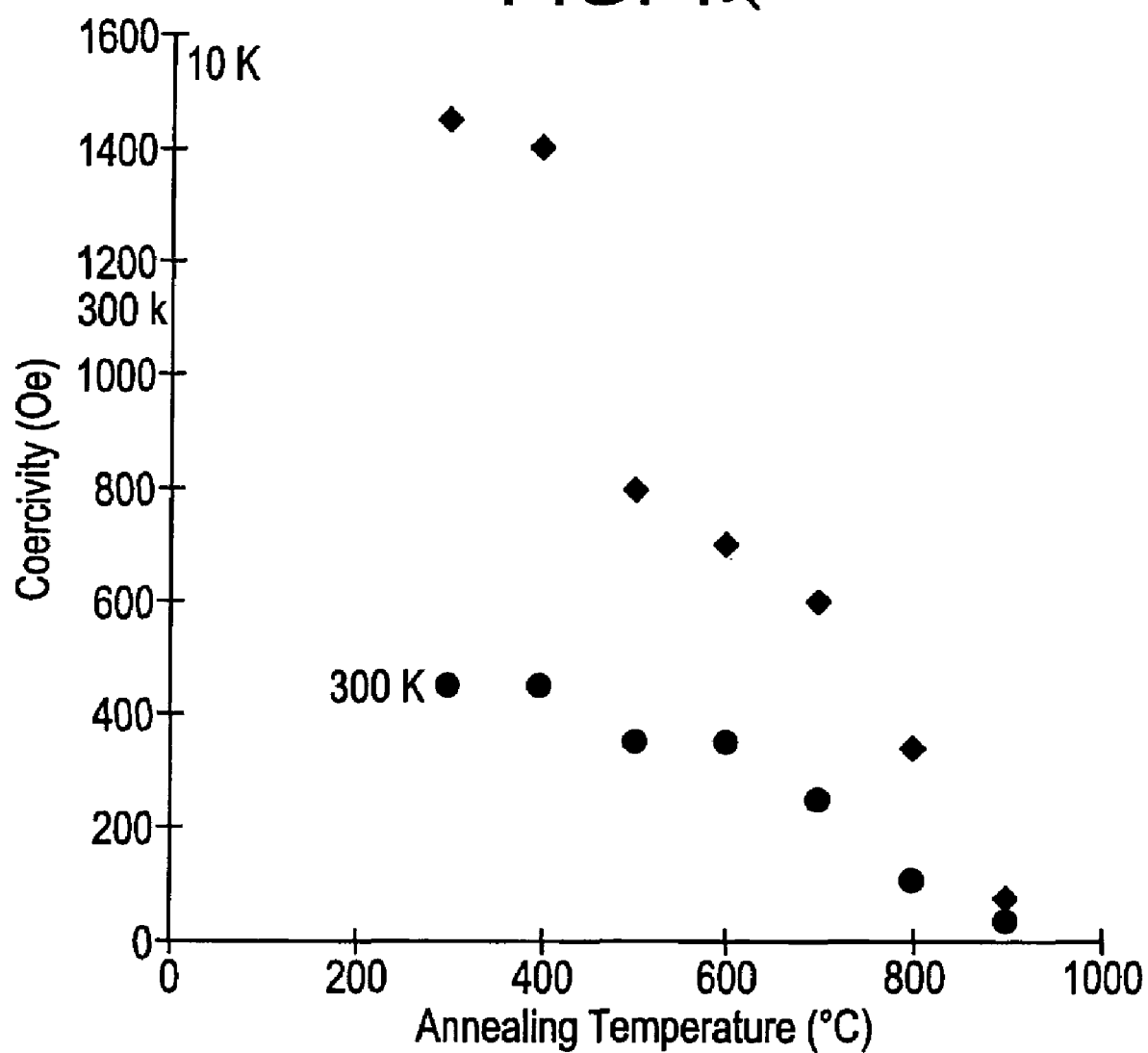
FIG. 12 is a graphical representation of the coercivity for a $Co/SiO_2$ nanocomposite measured at 10K (diamonds) and 300K (squares) as a function of annealing temperature.

Static magnetic properties for a material are characterized by its magnetization curve (from which saturation magnetization is obtained) and hysteretic loop (from which coercivity is obtained). FIG. 10 shows a magnetization curve and hysteresis loop, from which the saturation magnetization and coercivity are obtained. FIG. 11 shows the variation of saturation magnetization for $Co_{50}(SiO_2)_{50}$ with $H_2$ annealing temperature. When the material was annealed at 300° C., the saturation magnetization was 5,655 Gauss (G) owing to an incomplete reaction, whereas annealing at temperatures above 700° C. resulted in saturation magnetizations that were as large as 10,681 G. FIG. 12 shows the coercivity of the Co/SiO$_2$ nanocomposite as a function of $H_2$ annealing temperature. A drastic decrease of the coercivity with increasing $H_2$ annealing temperature was clearly demonstrated. This behavior was mainly due to the variation of the Co particle size with annealing temperature. Annealing at lower temperature resulted in smaller particle size (e.g., about 10 nm) and larger coercivity, while annealing at a higher temperature produced larger Co particles with lower coercivity.

As evidenced from the magnetic property study, the coercivity and particle size of the Co particles in the nanostructured composite may be tailored by varying the $H_2$ annealing temperature. For soft magnetic applications, low coercivity with high magnetization saturation is desirable. Optimal soft magnetic properties appeared at $H_2$ annealing temperatures greater than about 600° C.

Example 4

Fabrication of Magnetic Nanocomposite Toroidal Cores

The $Co/SiO_2$ nanostructured composite powders synthesized as described in Example 1 and 2 were consolidated to produce toroidal cores for high frequency bulk applications. This entailed (i) preparation of ready-to-press powders, (ii) consolidation of the ready-to-press powder into a green compact, (iii) toroid sample fabrication, and (iv) low temperature annealing.

First, the $Co/SiO_2$ nanocomposite was transferred to a beaker that contained wax (paraffin) in alcohol. After thorough mixing using mechanical stirring, the alcohol was slowly evaporated with heat, resulting in the uniform mixing of powder and wax, where the wax was coated on the surface of the composite particles.

The next step was to press the powder into consolidated form, followed by subsequent breaking of the consolidated bulk into fragments using a mortar and pestle. Using a milling technique, the corners of the fragments were trimmed off, resulting in highly flowable dense particles.

Green compact preparation was accomplished using a hydraulic press. Experimentally, the ready-to-press powder was transferred into a die, and pressed into a pellet under a load of about 200 MPa.

The pressed pellet was then machined into a toroid-shaped geometry. The sizes of the toroids were 1.5 cm in outer diameter, 0.5 cm in inner diameter, and 0.5 cm in height. A coil of four turns was wound along the circular direction of the toroid to form an inductor.

For consolidation, the as-fabricated toroids were then transferred into an environmental furnace for heat treatment. Heat treatment was performed at two stages: 500° C., and 700° C. in $H_2$. The 500° C. treatment was for about 0.5 hours, which allowed the materials to be dewaxed, resulting in a pure composite composition. The 700° C. treatment was performed over several hours, which allowed for sintering of the samples.

The consolidation of nanostructured composite materials is a critical step towards development of an optimal soft magnetic material. An isolated nanostructured composite particle possesses very high anisotropy owing to its large surface anisotropy and demagnetizing effect. For nanostructured composite materials, the soft magnetic properties come from intergrain interactions, mostly owing to the exchange coupling of the neighboring Co particles. The intergrain interactions tend to average the anisotropy of each individual particle, resulting in reduced anisotropy and, consequently, higher permeability. A critical parameter, the exchange coupling length, is the distance within which the magnetic moments of the two particles can be coupled. For Co, the exchange length is estimated to be about 20 nm. Therefore, the particles have to be consolidated to achieve separation of the neighboring particles, which is less than the exchange length.

Low temperature consolidation using a sintering aid: Owing to the high melting temperature of $SiO_2$, the solid-phase sintering of the $SiO_2$-coated particles is at a very high temperature. However, the addition of a small amount of $Na_2O$ into the $SiO_2$, which may form $Na_2SiO_3$, significantly reduced the sintering temperature to about 450° C. Thus, $Na_2SiO_3$-coated particles were consolidated by sintering at about 400 to about 500° C. Since $Na_2SiO_3$ has similar electrical properties to $SiO_2$, the addition of $Na_2O$ will not change the insulating behavior of the $SiO_2$ layer. Nanostructured $Co/SiO_2$ particles with various amounts of $Na_2O$ sintering additive were synthesized and sintered. The results show that the addition of a $Na_2O$ additive to the nanostructured composite may reduce the sintering temperature of the $Co/SiO_2$ system to about 500° C., with a compact density of 83%. Further densification of the compact up to 90% could be achieved once the composition of the additive was optimized.

Densifying the pre-sintered compacts by a hot isostatic press (HIP) process was performed at American Isostatic Press, Inc. (Columbus, Ohio). Initial results indicated that the pre-sintered compact could be densified by a HIP process to a density greater than about 90%.

Example 5

Properties of Consolidated Nanocomposite Toroidal Cores

A. Dynamic Magnetic Property Measurements

Complex permeability $\mu=\mu'-\mu''$ is the one of the most important parameters for characterizing the magnetic properties of materials for high frequency applications. In this equation, $\mu'$ is a measure of the softness of the magnetization process in an alternating magnetic field, and $\mu''$ is a measure of the loss of energy during the magnetization process. The ratio $\mu'/\mu''=Q$ is called the quality factor, a parameter extensively used in industry.

High frequency applications require magnetic materials with large $\mu'$ and large Q, while minimizing $\mu''$. The currently used ferrites, including spinel ferrites (($Ni, Zn)_2Fe_4$) and hexagonal ferrites ($Co_2Z$, where $Z=Ba_3Me_2Fe_{24}O_{41}$, where Me is a transition metal element), have a $\mu'$ value less than 15, and the cutoff frequencies (the frequency at which Q is less than or equal to 1) are less than 500 MHz. One proposed target is to develop a material with $\mu'$ greater than or equal to about 30 up to 500 MHz, with a cutoff frequency greater than or equal to about 1000 MHz. This frequency region is most appropriate for telecommunications. Another desirable target includes the region from about 400 to about 1000 kHz. A complex permeability experiment is critical for the $Co/SiO_2$ nanocomposite materials for high frequency (greater than about 1 MHz).

The complex impedance, $Z=R_x+j\omega L_x$, of the inductor was measured using an HP impedance meter for frequencies ranging from 10 Hz to 13 MHz and an RX impedance bridge for frequencies from 20 to 250 MHz. The following expressions were used to calculate $\mu'$, $\mu''$, and Q:

$$\mu' = \frac{D}{0.4N^2 S} L_x \qquad (1)$$

-continued $$\mu'' = \frac{D}{0.4N^2S} \frac{R_x}{\omega} \quad Q = \mu'/\mu'' \quad (2)$$

wherein:
D is the mean diameter of the toroid;
N is the number of turns of the coil wound on the toroid; and
ω denotes angular frequency.

Figure 13A:
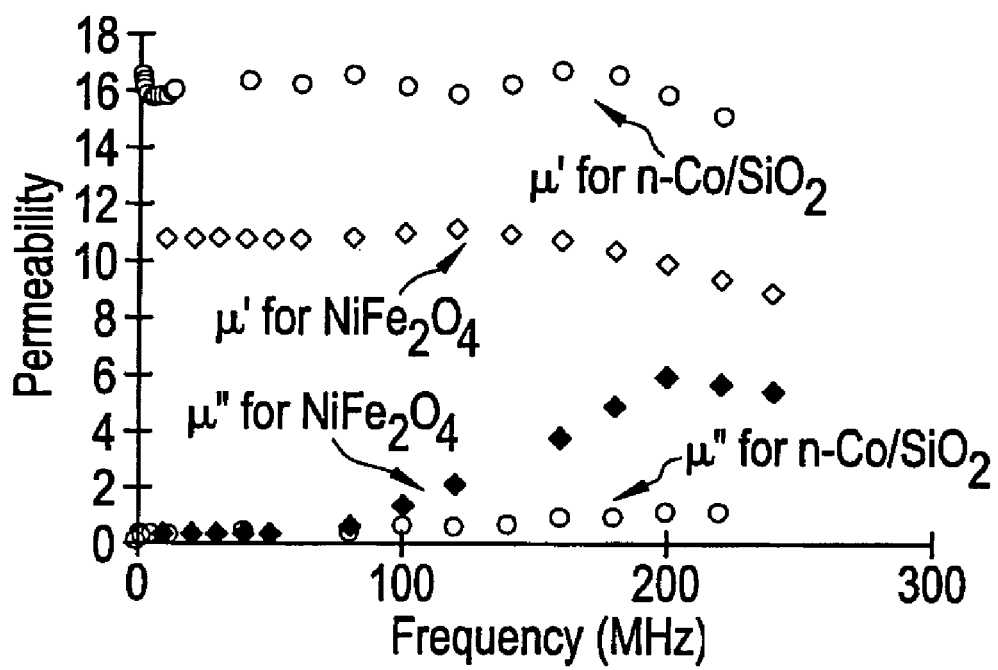
FIG. 13 is a graphical representation of the frequency dependence of (a) complex permeability μ' and μ" and (b) quality factor (Q) for a $Co/SiO_2$ nanocomposite and Ni-ferrite.

B. Permeability Comparison of Co/SiO$_2$ Nanostructured Composite and Ni Ferrite FIG. 13a shows the frequency dependence of μ' and μ" for a toroidal sample of Co$_{50}$/(SiO$_2$)$_{50}$. Superior high frequency performance was observed for μ' and μ" for the Co/SiO$_2$ nanocomposite compared to the conventional NiFe$_2$O$_4$ ferrite. For the Co/SiO$_2$ sample μ' was about 17, and it exhibited a very flat frequency response curve from 10 Hz up to the highest measured frequency of 240 MHz, while μ" remained close to zero for all frequencies. For the conventional NiFe$_2$O$_4$ ferrite μ' remained flat below 100 MHz, but gradually dropped above this frequency, while μ" increased rapidly when the frequency was greater than 100 MHz.

Figure 13B:
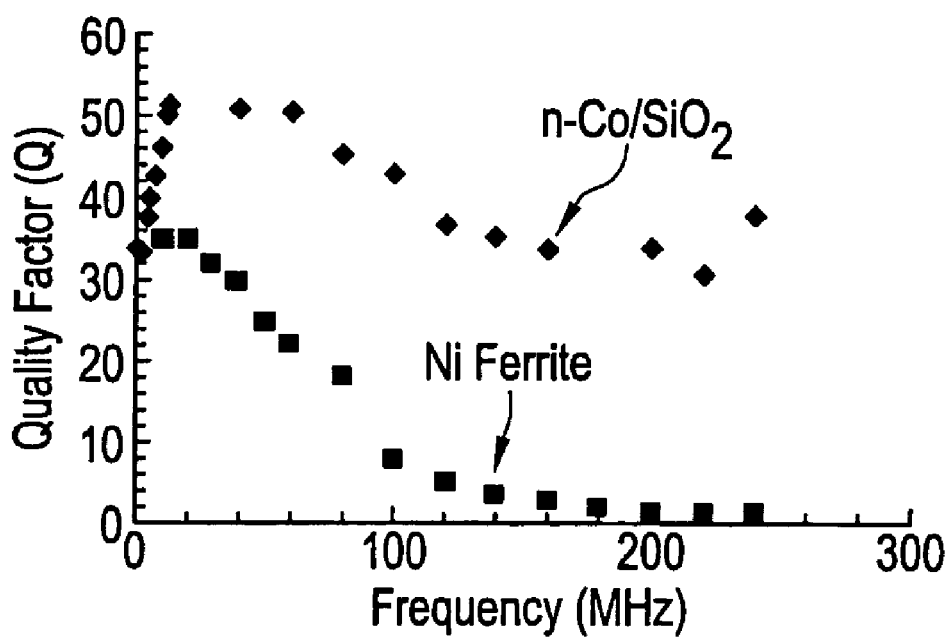

Meanwhile, the value of the quality factor Q (see FIG. 13b) for the Co/SiO$_2$ sample was greater than about 40 (up to 240 MHz), while the quality factor for conventional ferrite sample was about 2 when the frequency was greater than 100 MHz. These results demonstrated that the high frequency magnetic properties of the Co$_{50}$/(SiO$_2$)$_{50}$ nanocomposite were better than those of (Ni,Zn)$_2$Fe$_4$ and Co$_2$Z ferrites for the region above 100 MHz. These results were promising for telecommunications applications.

C. Permeability of Co/SiO$_2$ Nanostructured Composite and Known Materials

Figure 14:
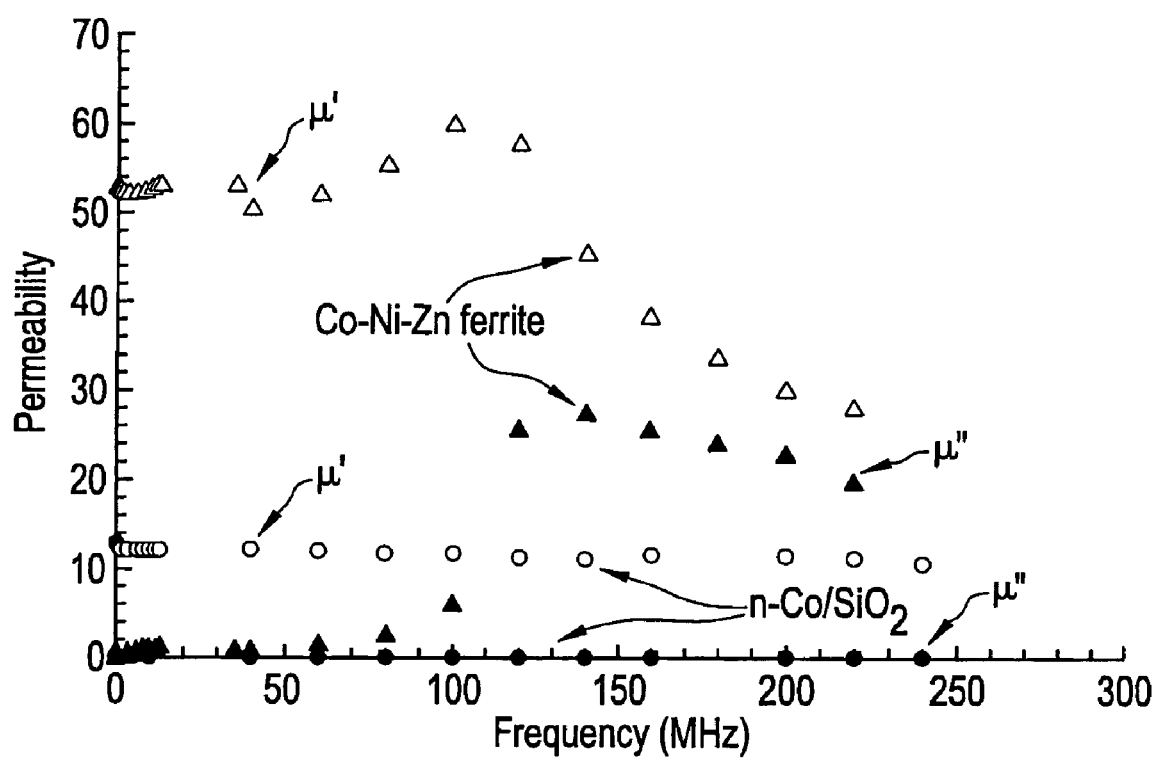
FIG. 14 is a graphical representation of the frequency dependence of complex permeability μ' (hollow) and μ" (filled) for a $Co/SiO_2$ nanocomposite (circles) and Co—Ni—Zn ferrite (triangles)

FIG. 14 shows a permeability comparison between the Co/SiO$_2$ nanocomposite and commercial Co—Ni—Zn ferrite. In contrast with a flat frequency dependence for Co/SiO$_2$, μ' for the Co—Ni—Zn ferrite drastically decreased and μ" increased with increasing frequency above 100 MHz. Therefore, this was another example of superior performance of the Co/SiO$_2$ nanocomposite compared to a conventional material of a different composition. Generally, a material is not suitable for use if the quality factor is less than 10. For the Co—Ni—Zn ferrite, it is less than 5 at 100 MHz as shown in FIG. 14.

Figure 15:
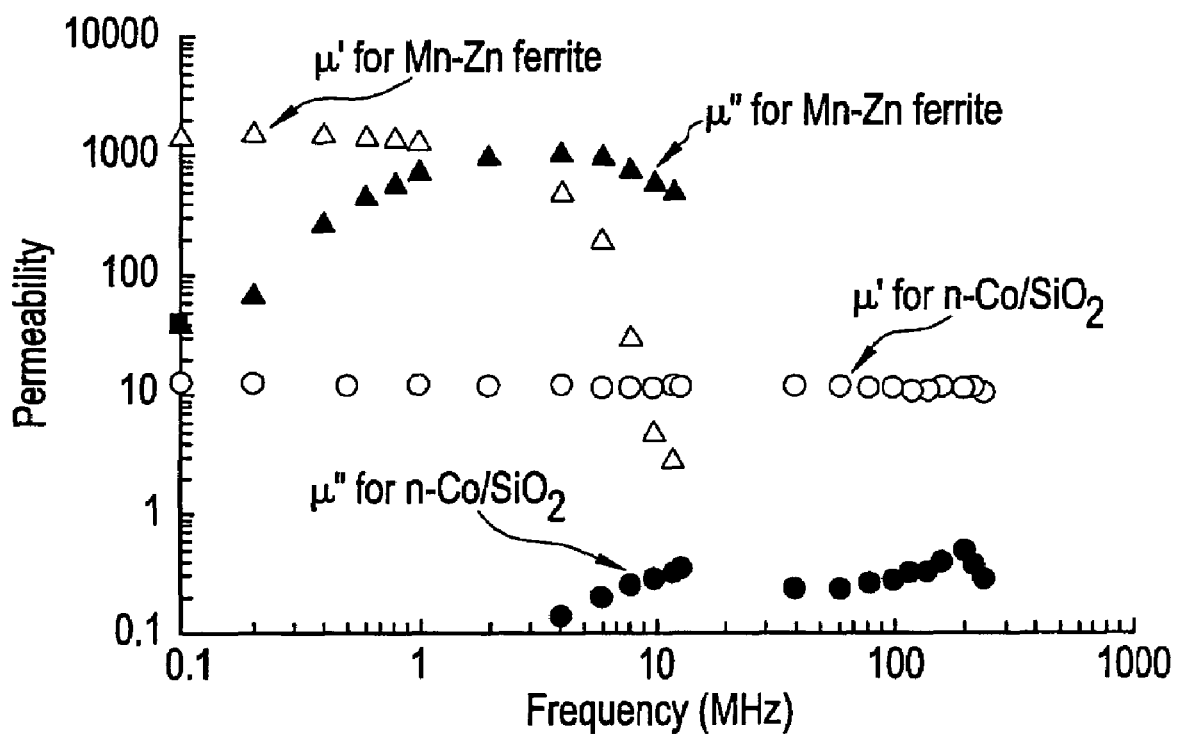
FIG. 15 is a graphical representation of the frequency dependence of complex permeability μ' (filled) and μ" (hollow) for a $Co/SiO_2$ nanocomposite (circles) and Mn—Zn ferrite (triangles)

FIG. 15 shows a permeability comparison between the Co/SiO$_2$ nanocomposite and a Mn—Zn ferrite, MN8cx (obtained from Ceramic Magnetics). This ferrite is designed for power converters operating in the range of 0.5 to 2 MHz. As shown in the figure, at 2 MHz the Q value for MN8cx is less than 1. As evidenced in FIG. 15, Co/SiO$_2$ nanocomposite materials exhibited superior frequency response up to at least 240 MHz (measurement limit), where the Q value was 40.

Figure 16:
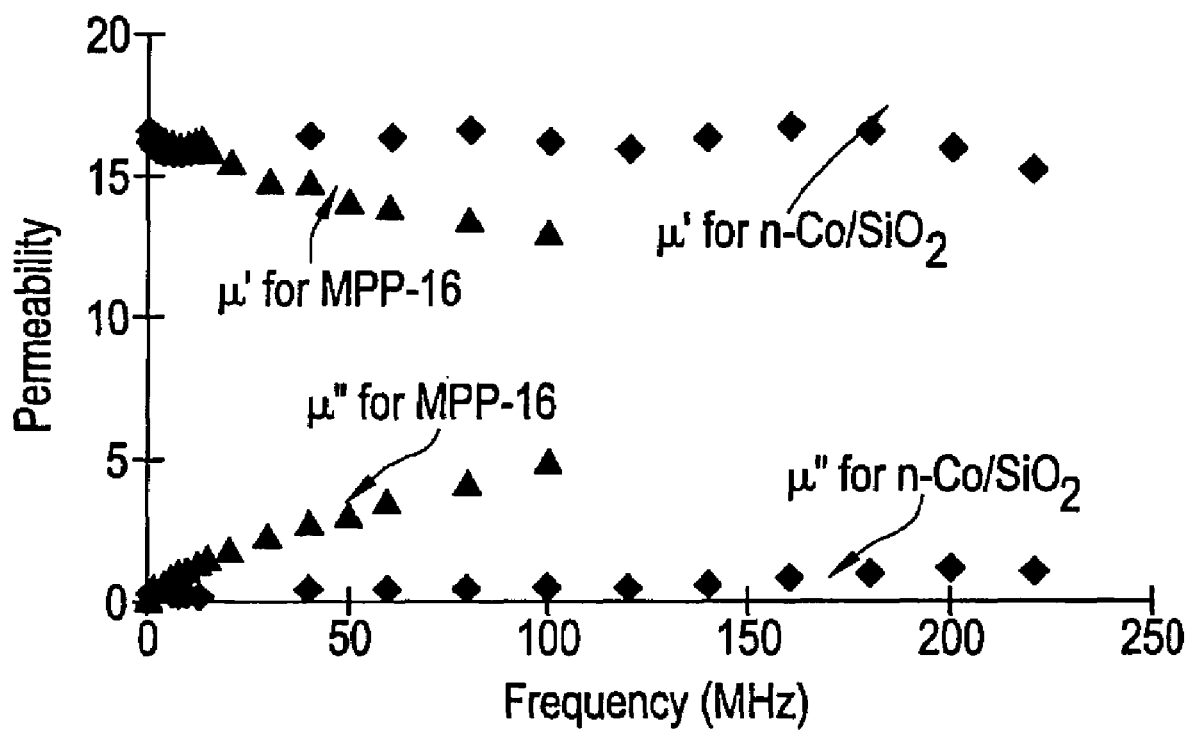
FIG. 16 is a graphical representation of the frequency dependence of complex permeability μ' and μ" for a $Co/SiO_2$ nanocomposite and MPP-16 PERMALLOY.

FIG. 16 shows a comparison of the permeability frequency dependence between the Co/SiO$_2$ nanocomposite and a conventional MPP-16 (PERMALLOY) core, supplied by NASA. The MPP-16 is made of micron-sized Mo-PERMALLOY particles embedded in an insulating matrix so as to increase its resistivity and, consequently, reduce the eddy current at elevated frequencies. This type of material can be referred to as a microcomposite. Generally, with decreased particle size comes lower loss and consequently higher usable frequency. However, this results in severe reduction in the permeability. The bulk Mo-PERMALLOY exhibited a permeability of 10$^4$ to 10$^5$, but as shown in FIG. 16, μ' was only 16 for the MPP-16 microcomposite.

The Co/SiO$_2$ nanocomposite and the MPP-16 materials showed similar μ' at low frequency. The μ' and μ" permeability frequency response for the Co/SiO$_2$ nanocomposite was essentially flat up to 240 MHz. For the MPP-16, μ' decreased, while μ" increased rapidly from 1 MHz. At 100 MHz, a 20% decrease in μ' was observed, and the Q value was less than 10 above 15 MHz. This result demonstrated the advantage of the Co/SiO$_2$ nanocomposite materials over conventional microcomposite materials.

Example 6

Synthesis of Fe—Ni/SiO$_2$ Nanostructured Composite Powders

The principal aspects involved in producing Fe—Ni-based nanocomposites were the same as for producing Co/SiO$_2$ nanocomposites. The precursor materials in the synthesis include iron nitrate, nickel nitrate, TEOS, glucose, and deionized water. The synthetic steps were similar to the Co/SiO$_2$ nanocomposite system. Detailed synthetic steps are provided:

Starting precursors of TEOS, iron nitrate, nickel nitrate, and glucose were dissolved in DI water. This precursor solution was stirred to obtain a homogenous solution.

The precursor solution was converted into a precomposite powder by heating the precursor solution from about 120 to about 150° C., under vigorous stirring to prevent possible precipitation of any elements.

For conversion of precomposite into Fe—Ni/SiO$_2$ nanostructured composite, the precomposite powder was transferred to an environmental furnace (modified Thermolyne). The powder was first heated to 500° C. in open air for 0.5 hours. The purpose of this heat treatment was to calcine the precomposite powder. After the calcination, Fe, Ni, and Si were present in the form of amorphous oxides, namely, iron oxide, nickel oxide, and silica.

The oxide forms of the precomposite were then converted into Fe—Ni/SiO$_2$ nanostructured composite under a reducing atmosphere (e.g., under H$_2$). The system was then purged and H$_2$ gas was introduced immediately after the oxidation reaction at 500° C. The reduction experiments were performed temperatures varying from about 300 to about 900° C. with a H$_2$ flow rate of 2 liters/minute. All temperatures produced Fe—Ni/SiO$_2$ nanocomposite powders.

For surface passivation, after the reduction was complete, the system was purged with N$_2$ gas for 20 minutes to de-activate the Fe—Ni surface. The system was then cooled down under N$_2$. Before exposing to air, droplets of mineral oil were sprinkled onto the powder surface with enough time allowed for oil diffusion, while the reactor was purging with N$_2$. Excess oil was removed with hexane.

Example 7

Synthesis of Fe/NiFe$_2$O$_4$ Nanocomposite Powders

Chemical precursors of (Fe(C$_6$H$_5$O$_7$)3H$_2$O), 145.4 g nickel nitrate (Ni(NO$_3$)$_2$6H$_2$O) and 64.36 g citric acid were dissolved in 1000 ml of deionized water with stirring to obtain a homogenous solution mixture. The mixture was dried in oven at 40° C. overnight and crushed sufficient to pass through a 60 mesh screen. The crushed powder was calcined at temperatures varying from about 200 to about 900° C. for 2 hours in air to remove carbon and form nanostructured NiFe$_2$O$_4$.

Characterization revealed that for calcination below about 700° C., the obtained $NiFe_2O_4$ nanoparticles had dimensions of less than about 15 nm, and above 700° C., the particle dimensions of the ferrite varied from about 10 to about 100 nm.

The obtained $NiFe_2O_4$ was then mixed mechanically with Fe nanoparticles or ceramic (i.e., $SiO_2$ or $B_2O_3$) coated Fe nanoparticles to obtain a $Fe/NiFe_2O_4$ nanocomposite powder. The mixing procedure for obtaining an 80% $Fe/SiO_2$+20% $NiFe_2O_4$ follows:

124.5 g $NiFe_2O_4$ was mixed with 579.0 g $Fe/SiO_2$ (Fe to $SiO_2$ molar ratio was 70 to 30) by ball milling in alcohol for 24 hours. The milled slurry was dried in an oven at about 30° C. for about 24 hours to obtain the $Fe/NiFe_2O_4$ nanocomposite.

Example 8

Synthesis of $Fe/SiO_2$ Nanocomposite Powders 291.258 g $Fe(NO_3)_3 9H_2O$, 37.30 g $Si(C_2H_5O)_4$, and 50 g of glucose were dissolved in 500 ml ethanol in a 2 liter glass beaker. The beaker was than placed on a hot plate at about 70° C. and stirred with a mechanical stirrer until the material was completely dissolved. The material gradually formed a gel after heating for two hours. After the experiment was complete, the material was heated in an oven at 100° C. to obtain a Fe—Si—O precomposite powder complex.

The precomposite powder was then oxidized in a controlled oxygen/nitrogen environment at 300° C. for 4 hours in air and then reduced using $H_2$ to obtain $Fe/SiO_2$ nanocomposite powders at about 400 to about 600° C. in a furnace. The obtained nanocomposite was an alpha-phase Fe with particle size ranging from about 20 to about 80 nm, and a $SiO_2$ phase that was amorphous and uniformly coated onto the Fe nanoparticle surface.

Example 9

Synthesis of Co/Polymer Nanocomposite Powders

The preparation of Co/polymer consisted of thermally decomposing cobalt carbonyl in and organic solvent containing a polymer as a stabilizing medium. Experimentally, 2.4 grams of $Co_2(CO)_8$ were weighed and poured into a three-neck 100 ml round bottom flask (fitted with a reflux condenser, connected to vacuum lines and flushed with nitrogen). A total of 50 ml of toluene was used. A portion of toluene was added with an injection syringe and the mixture was stirred under nitrogen. 0.525 grams monocarboxy-terminated polystyrene (Scientific Polymer Products, MW 13,000) was then dissolved in the remaining toluene solution and added to the reaction vessel. The temperature of the toluene was then raised to 130° C., and refluxed under nitrogen for 24 hours. The resultant material comprised black Co colloidal particles uniformly distributed in the polymer matrix, or Co nanoparticles coated with a polymer film. The Co/polymer system was a stable metal/polymer nanocomposite. X-ray diffraction revealed the resultant material to be a fcc Co phase, with average particle size less than about 10 nm. HRTEM indicated that the Co was between about 1 to about 15 nm in size, surround by amorphous material (probably polymer).

Other polymers were used to fabricate Co/polymer nanocomposites, including polystyrene (MW 280,000, Density 1.047, $T_g$ 100° C.), polystyrene sulfonated sodium salt (1.7 $Na^+SO3^-$ per 100 styrene, $M_n$ 100,000 and MW 200,000), and poly(styrene-co-acrylonitrile) (MW about 165,000, 25 wt % acrylonitrile).

Example 10

Fabrication of Magnetic Nanocomposite Toroidal Cores

The synthesized $Co/SiO_2$, Co/polymers, $Fe—Ni/SiO_2$, $Fe/SiO_2$, and $Fe/NiFe_2O_4$ nanocomposite powders were consolidated to produce toroidal cores for high frequency bulk applications. The consolidation step was similar to the procedures described in Example 4.

Example 11

HVOF Sprayed Ni—Zn-Ferrite Thick Films Using Powder Feedstocks

The substrate was coarsened by sand blasting ($Al_2O_3$ grit, 30 mesh), degreased, cleansed in acetone, and was preheated up to 120° C. by plasma torch scanning. An HVOF system (DJ-Sulzer Metco) was employed to deposit the films. Propylene was used as the fuel gas. Ni—Zn-ferrite films were deposited by three HVOF processes in which the spray parameters including $O_2$ flow rate, fuel flow rate, and spray distance were varied. The spray parameters are listed in Table 1.

TABLE 1

| HVOF spray parameters for thermal spray Ni—Zn ferrite | | | |
|---|---|---|---|
| | $C_3H_6$-rich | Neutral | $O_2$-rich |
| $O_2$ pressure/Flowrate (PSI/SCFH) | 150/620 | 150/620 | 150/1017 |
| $C_3H_6$ pressure/Flowrate (PSI/SCFH) | 80/185 | 80/137 | 80/185 |
| Feed rate (lb/hr) | 5 | 5 | 5 |
| Spray distance (inch) | 7.5 | 7.0 | 7.0 |
| Gun traverse speed (mm/s) | 1000 | 1000 | 1000 |

Figure 17:
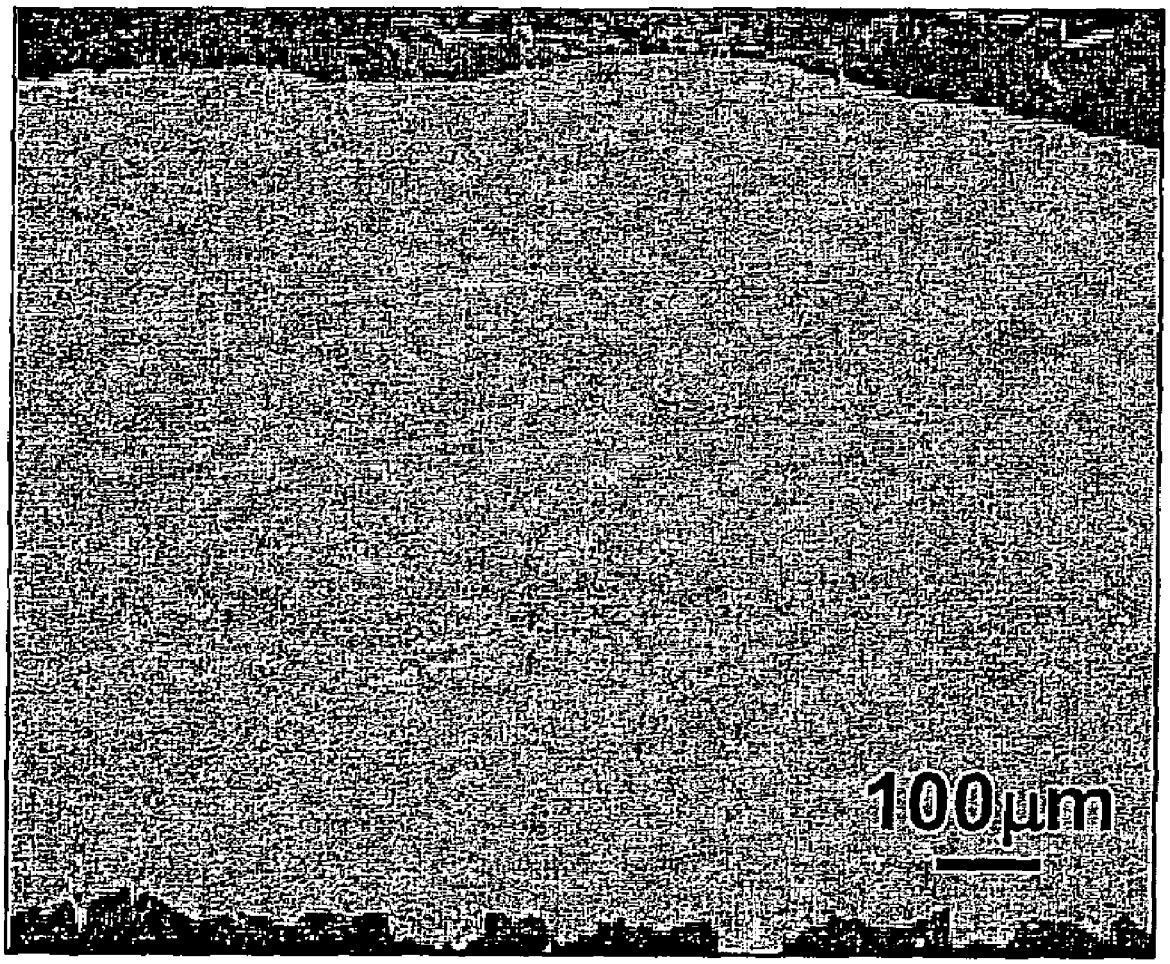
FIG. 17 is an electron micrograph of a cross-section of a Ni—Zn-ferrite thick film deposited by high velocity oxygen fuel thermal spray (HVOF)
Figure 18:
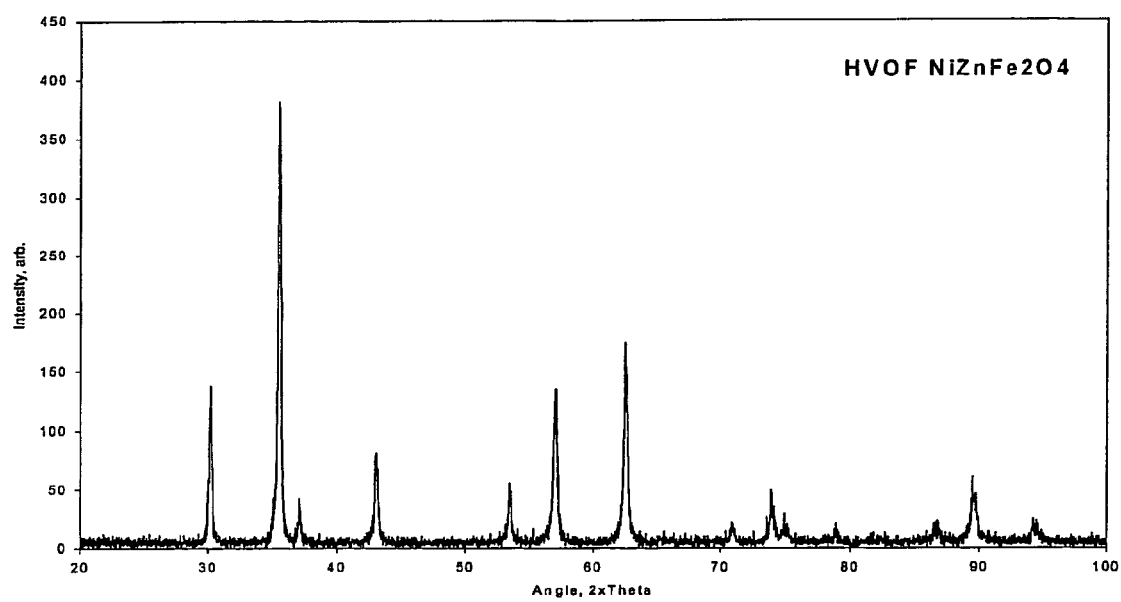
FIG. 18 illustrates an XRD pattern of a Ni—Zn-ferrite thick film deposited by HVOF.

An electron micrograph of an HVOF-deposited Ni—Zn-ferrite film is shown in FIG. 17. The film thickness was about 700 micrometers with porosity of less than about 2%. The film was crack-free and well adhered to the substrate. Using the HVOF, the film thickness could be varied from about 50 to about 1000 micrometers. The XRD powder pattern, as shown in FIG. 18, indicated that phase pure Ni—Zn-ferrite was obtained. The deposition rate was about 25 micrometers per coating pass under normal conditions, about 10 micrometers per pass under neutral condition and 4 micrometers per pass under $O_2$-rich conditions. The decreasing coating rate is believed to have been related to the reduction in flame temperature, while the flame varied from fuel-rich to $O_2$-rich. XRD and microstructural analysis indicated that the deposited film had a density greater than about 95% of the theoretical density with a grain size of about 50 nm.

Example 12

Plasma Sprayed Ni—Zn-Ferrite Thick Film Using Precursor Solution

Figure 19:
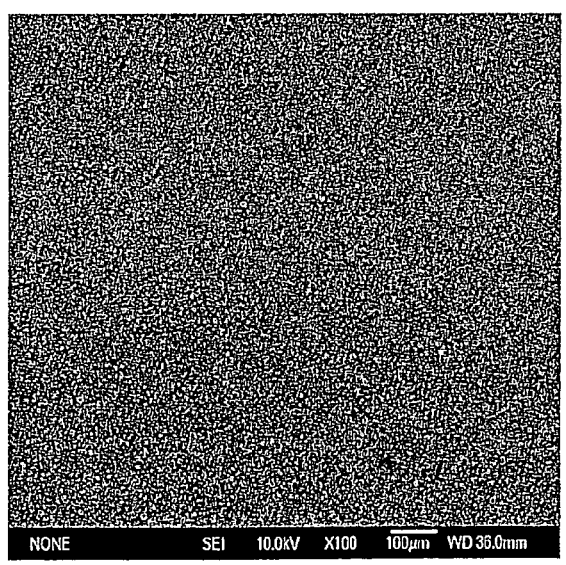
FIG. 19 is an electron micrograph of a Ni—Zn-ferrite nanocomposite thick film deposited by solution precursor plasma spray.

A Ni—Zn-ferrite thick film was made by the precursor solution plasma spray process. The substrate was coarsened by sand blasting ($Al_2O_3$ grit, 30 meshes), degreased, and cleaned in acetone. A precursor solution was prepared from Ni—, Zn— and Fe-salts according the stoichiometry of the final composition. Specifically, the precursor solution was prepared by dissolving iron nitrate, nickel nitrate, and zinc nitrate in distilled water to form a precursor solution. The solution pH was adjusted from about 3 to about 5 by adding an appropriate amount of ammonium hydroxide. The liquid precursor was pumped from liquid reservoirs and delivered to a liquid injector. The flow rate and the downstream pressure of the liquid precursor were regulated by a flowmeter and pressure regulator, respectively. The liquid precursor was fed into the plasma torch. A Metco 9M plasma spray system was employed to deposit the film, and the spray parameters are listed in Table 2. The film thickness could be varied from several micrometers to hundreds of micrometers. The morphology of a 20 micrometer coating is shown in the electron micrograph of FIG. 19. XRD revealed a single crystalline phase. The average grain size for the films from X-ray peak broadening and the Scherrer equation was estimated to be about 30 nm.

TABLE 2

Plasma spray parameters for deposition of Ni—Zn-ferrite films using the precursor solution technique

| Primary Gas (Ar) flow rate | 100 PSI, 120 SCFH |
|---|---|
| Secondary Gas ($H_2$) flow rate | 50 PSI, 22 SCFH |
| Plasma Current (amp) | 650 |
| Plasma voltage (volts) | 35-50 |
| Gun traverse speed (mm/s) | 1000 |
| Spray distance (in) | 2.5 |
| Feed rate (ml/min) | 25 |

Example 13

Nanocomposite Ni—Zn-Ferrite/$SiO_2$ Soft Magnetic Thick Film Deposited by Solution Precursor Plasma Spray Technique Ni—Zn-ferrite/20% $SiO_2$ (weight percent) thick films were deposited on an aluminum substrate using a solution precursor plasma spray method. The solution precursor was prepared by dissolving iron nitrate, nickel nitrate, zinc nitrate and TEOS in distilled water to form a precursor solution. The solution pH was adjusted from about 3 to about 5 by adding appropriate amounts of ammonium hydroxide. The thick films were formed by deposition of the solution precursor according to the parameters in Table 3.

TABLE 3

Plasma spray parameters for deposition of Ni—Zn-ferrite/silica films using precursor solution technique

| Primary Gas (Ar) flow rate (SCFH) | 80 |
|---|---|
| Secondary Gas ($H_2$) flow rate (SCFH) | 27 |
| Plasma Current (amp) | 650 |
| Plasma power (kilowatts) | 45 |
| Gun traverse speed (mm/s) | 1000 |
| Spray distance (in) | 2.5 |
| Feed rate (ml/min) | 25 |
| Substrate preheat temperature (° C.) | 200 |

The Ni—Zn-ferrite/$SiO_2$ nanocomposite films were highly crystalline as well as of high purity, correct stoichiometry, and uniform thickness as confirmed by magnetic property measurements and XRD. The average grain size for the films from X-ray peak broadening and the Scherrer equation was estimated to be about 27 nm.

Example 14

HVOF Sprayed Ni—Zn-Ferrite/$SiO_2$ Composite Thick Films

The substrate was coarsened by sand blasting ($Al_2O_3$ grit, 30 mesh), degreased, cleansed in acetone, and was preheated up to 120° C. by plasma torch scanning. An HVOF system (DJ-Sulzer Metco) was employed to deposit the films. Propylene was used as the fuel gas. Ni—Zn-ferrite/25 % (volume) $SiO_2$ films were deposited by three HVOF processes in which the spray parameters including $O_2$ flow rate, fuel flow rate and spray distance were varied. The spray parameters are listed in Table 4. Much like the Ni—Zn-ferrite films deposited in Example 11, these films had a density greater than about 95% of the theoretical density with a grain size of about 50 nm.

TABLE 4

HVOF spray parameters for depositing Ni—Zn-ferrite/25% $SiO_2$ nanocomposite thick films

| $O_2$ pressure/Flow rate (PSI/SCFH) | 150/620 |
|---|---|
| $C_3H_6$ pressure/Flow rate (PSI/SCFH) | 80/185 |
| Feed rate (lb/hr) | 4 |
| Spray distance (inch) | 7 |
| Gun traverse speed (mm/s) | 500 |

Example 15

Heat-Treated HVOF Sprayed Ni—Zn-Ferrite Thick Films

Figure 20:
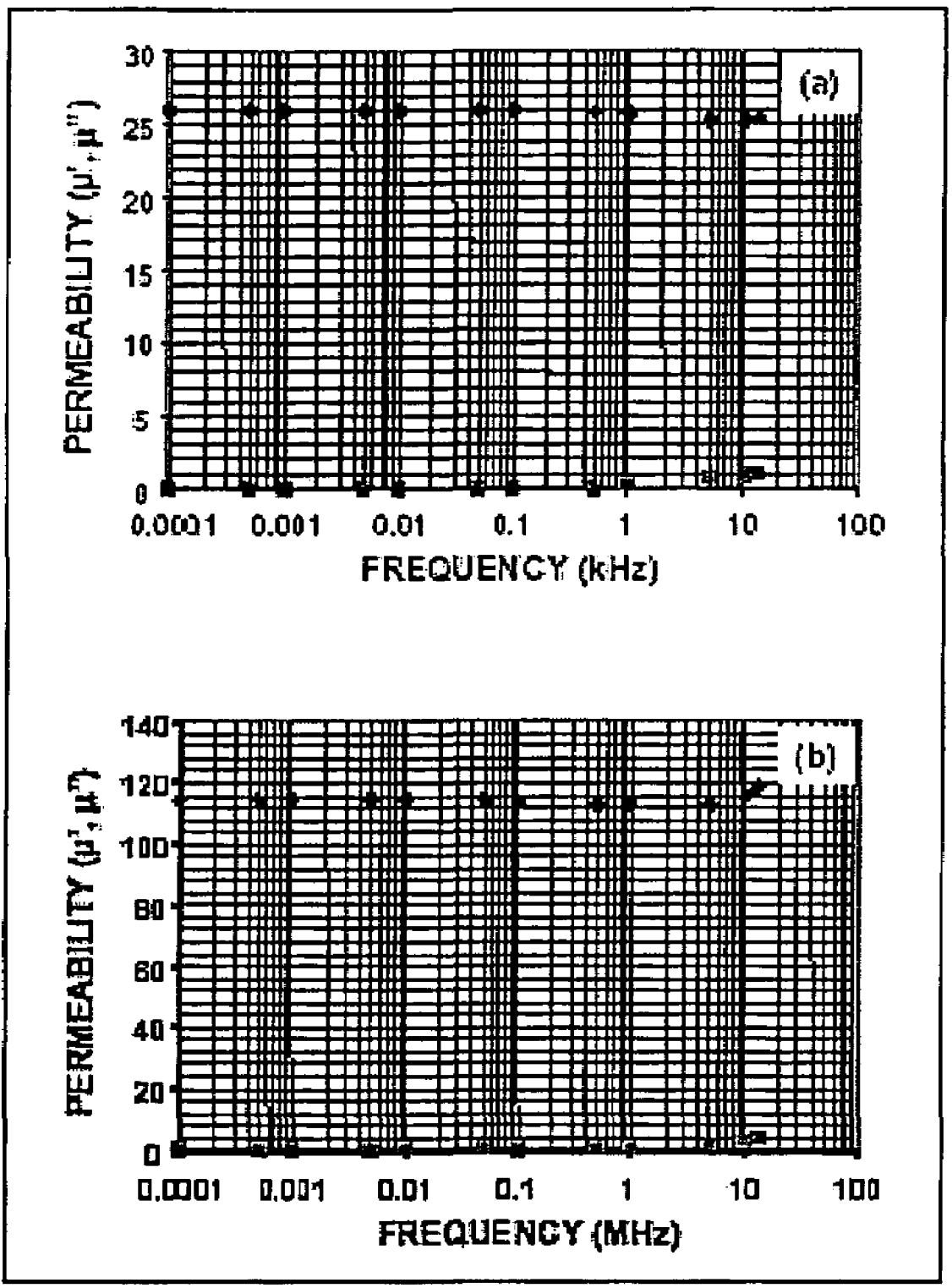
FIG. 20 is a graphical representation of the complex permeability as a function of frequency for an (a) as-sprayed and (b) annealed sample of a Ni—Zn-ferrite thick film.

Ni—Zn-ferrite films of Example 11 were further heat-treated at elevated temperature in air. The temperature and time were varied from about 800 to about 1100° C. for about 2 to about 4 hours, respectively. The magnetizations of the heat-treated Ni—Zn-ferrite samples were measured at 10 K. The results revealed a large variation in the saturation magnetization of these samples. For example, FIG. 20 shows the initial complex permeability of an HVOF-sprayed Ni—Zn-ferrite film as a function of frequency. For the untreated sample, $\mu'$ was about 25 as seen in FIG. 20a. After heat treatment in air at 1100° C. for 2 hours, $\mu'$ dramatically increased to about 118, as shown in FIG. 20b. The increase in $\mu'$ was attributed to the elimination of impurity $\alpha$-Fe and Fe—O phases and the removal of residual stress during heat treatment. For the untreated film sample, the ferrite partially decomposed into $\alpha$-Fe and Fe—O, which diminished the magnetic properties. Furthermore, the reduction of $Fe^{3+}$ to $Fe^{2+}$ lowered the resistivity and consequently, the high frequency properties. Therefore, a neutral flame or oxidized flame during heat treatment or deposition was favored for optimizing the phase structure and magnetic properties of the HVOF sprayed ferrite films.

Example 16

Air Plasma Sprayed $Fe_3O_4$ Magnetic Thick Film

The substrate was coarsened by sand blasting ($Al_2O_3$ grit, 30 mesh), degreased, and cleansed in acetone. A Metco 9M plasma spray system was employed to deposit the nanostructured $Fe_3O_4$ magnetic thick film. Spray parameters are listed in Table 5. Film thickness could be varied from several micrometers to hundreds of micrometers. The films had nanostructured grains, with average grain size less than about 100 nm. Film porosity was less than 3%.

TABLE 5

Plasma spray parameters for $Fe_3O_4$ films.

| | |
|---|---|
| Primary Gas (Ar) flow rate (SCFH) | 100 |
| Secondary Gas ($H_2$) flow rate (SCFH) | 24 |
| Plasma Current (amp) | 500 |
| Plasma voltage (volts) | 35 |
| Gun traverse speed (mm/s) | 1000 |
| Spray distance (in) | 4 |
| Feed rate (lb/hr) | 5 |

Example 17

HVOF Sprayed $Fe_3O_4$ Magnetic Thick Film

The substrate was coarsened by sand blasting ($Al_2O_3$ grit, 30 mesh), degreased, and cleansed in acetone. In another procedure, the substrate was subsequently heated to about 120° C. by plasma torch scanning. An HVOF system (DJ-Sulzer Metco) was employed to deposit the films. Propylene was used as the fuel gas. The HVOF spray parameters for deposition of $Fe_3O_4$ thick films are listed in Table 6. Regardless of whether the substrates were heated, films were very dense, with porosity less than about 2% and grain sized of less than about 100 nm. Film thickness for both procedures could be varied from few tens of micrometers up to millimeters depending on deposition time.

TABLE 6

HVOF sprayed $Fe_3O_4$ thick films

| | |
|---|---|
| $O_2$ pressure/Flow rate (PSI/SCFH) | 150/620 |
| $C_3H_6$ pressure/Flow rate (PSI/SCFH) | 80/185 |
| Feed rate (lb/hr) | 4 |
| Spray distance (inch) | 6 |
| Gun traverse speed (mm/s) | 500 |

Example 18

HVOF Sprayed Ni—Zn-Ferrite/$SiO_2$ Nanocomposite Thick Films

Figure 21:
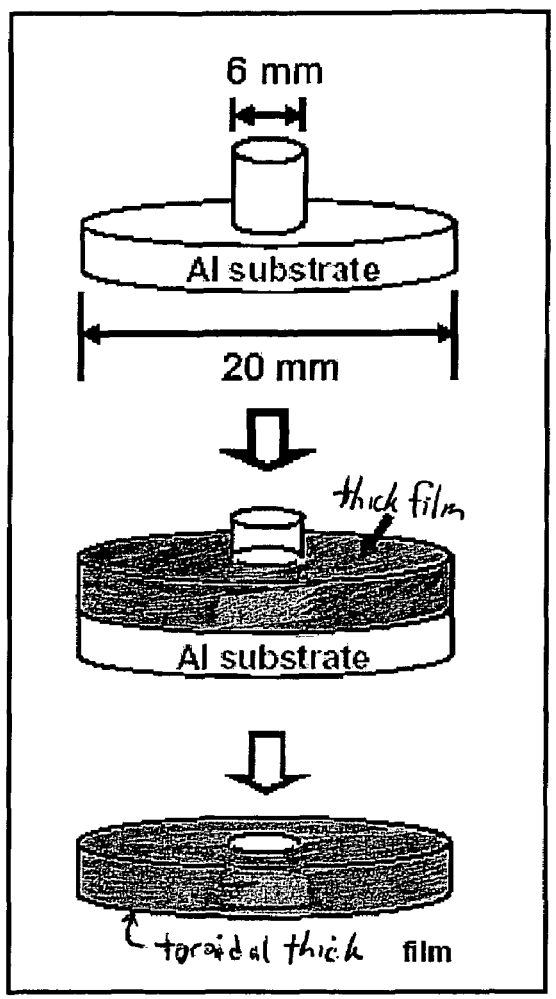
FIG. 21 is a schematic illustration of the production of free-standing toroidal thick film using a tailored substrate.

Ni—Zn-ferrite/55% (volume) $SiO_2$ was deposited on an aluminum substrate by an HVOF process. FIG. 21 illustrates a substrate that was tailored to produce free-standing toroid films. Alternatively, the post in the center of the substrate may be removed to produce free-standing pellet films. The substrate was coarsened by sand blasting ($Al_2O_3$ grit, 30 mesh), degreased, cleansed in acetone, and preheated to about 120° C. by plasma torch scanning. An HVOF system (DJ-Sulzer Metco) was employed to deposit the films. Propylene was used as the fuel gas. The process parameters are listed in Table 7. Ni—Zn ferrite/$SiO_2$ was sprayed onto either the disk or the disk with the post. The substrate was then dissolved in NaOH solution to produce a free-standing pellet or toroid.

TABLE 7

Parameters for HVOF sprayed Ni—Zn-ferrite/$SiO_2$ nanocomposite thick films

| | |
|---|---|
| $O_2$ pressure/Flowrate (PSI/SCFH) | 150/620 |
| $C_3H_6$ pressure/Flowrate (PSI/SCFH) | 80/185 |
| Feed rate (lb/hr) | 4 |
| Spray distance (inch) | 6 |
| Gun traverse speed (mm/s) | 500 |

Example 19

Three Component (Fe/$SiO_2$)/Ni-Ferrite Nanocomposite Synthesis

In one example, the as-synthesized Fe/$SiO_2$ nanocomposite described in Example 8 and the as-synthesized Ni-ferrite described in Example 7 were mixed via ball milling to achieve 70% (volume) Fe/$SiO_2$; other ratios of 50%, and 30% were also prepared. The ball milled three-phase mixture was then vacuum hot-pressed at elevated temperatures (about 700 to about 1100° C.) to form the consolidated three-component nanocomposite, with a packing density of greater than 90%. The consolidated nanocomposite was then shaped into toroids for magnetic property evaluation. The microstructure of the toroids agreed with the schematic shown in FIG. 22. Specifically, the Fe nanoparticles had dimensions of about 30 nm, the $SiO_2$ coating was less than about 30 nm thick, and the Fe/$SiO_2$ nanocomposite particles were uniformly embedded in the Ni-ferrite.

Example 20

Consolidation of Magnetic Nanocomposite Powders

Figure 23:
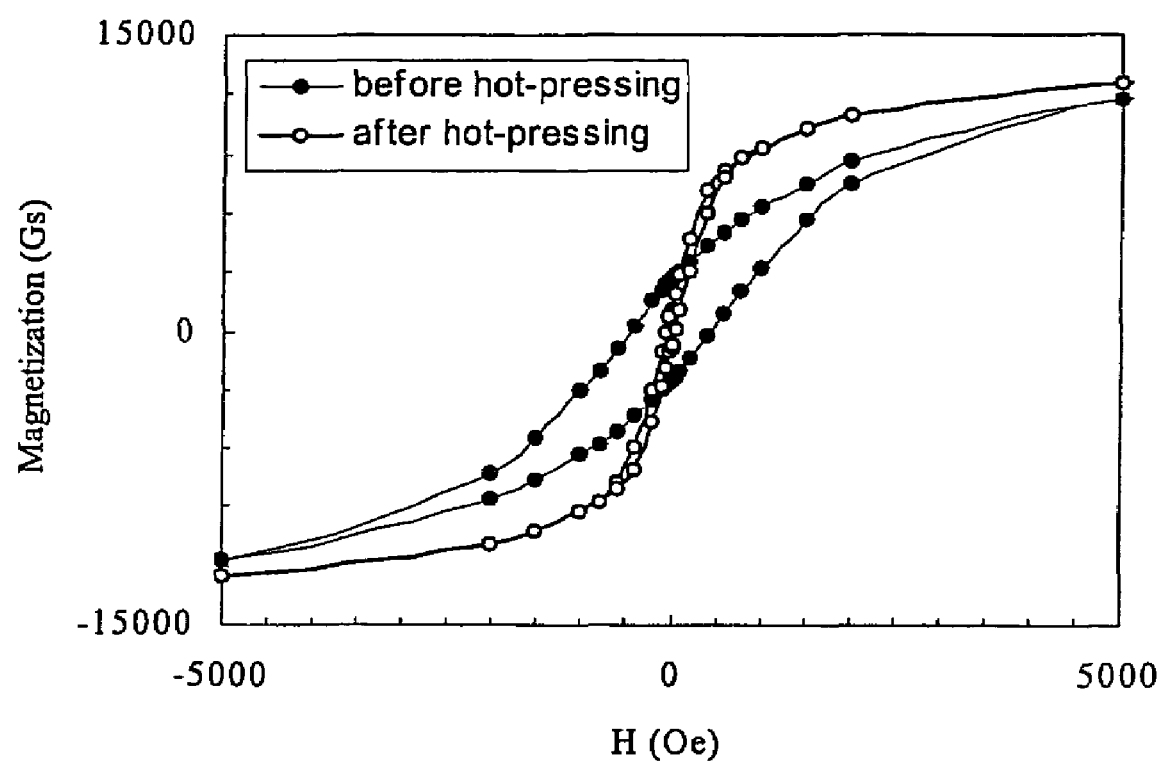
FIG. 23 is a graphical representation of the room temperature hysteresis loops for an $Fe_{0.7}/(SiO2)_{0.3}$ nanocomposite before (solid circles) and after (hollow circles) consolidation.

Fe/$SiO_2$ nanocomposites of different Fe volume % were consolidated with various packing densities. The consolidated products retained their microstructure and there were no pressure-induced phase transformations observed by XRD. Characterization of the consolidated products revealed essentially similar saturation magnetizations as uncompressed products, indicating that oxidation of the Fe did not occur during consolidation. FIG. 23 shows the hysteresis loops for a $Fe_{0.7}/(SiO_2)_{0.3}$ sample before and after consolidation. A large decrease in the coercivity was observed, which may be a consequence of exchange coupling in the consolidated product. Similar trends were observed for other compositions.

Figure 24:
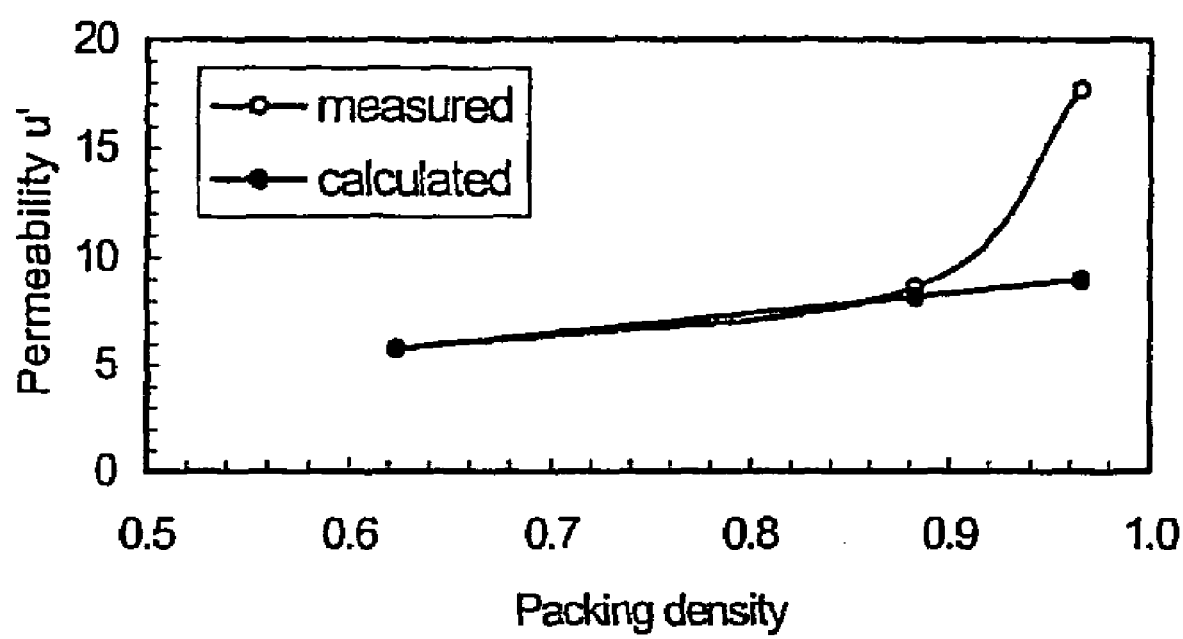
FIG. 24 is a graphical representation of the permeability as a function of packing density for a consolidated $Fe/SiO_2$ nanocomposite.

FIG. 24 shows the permeability as a function of packing density for the Fe/$SiO_2$ nanocomposite. If there were only a volume effect, a linear variation of the permeability with packing density would be expected. However, a sudden increase in permeability was evidenced when packing density increased above about 90%. This result is consistent with exchange coupling theory based on which a variation of permeability ($\mu$) with particle-particle distance, d, can be expected ($\mu \propto d^{-6}$).

From the experimental results of the consolidated samples, several conclusions were made. First, the nanocomposites can be consolidated to a density greater than about 90% of the theoretical density, without causing a phase transformation, to achieve exchange coupling (less than about 35 nm particle-particle distance). Also, based on the Fe volume fraction, high saturation magnetization Fe/insulator nanocomposites can be produced. Finally, the exchange coupling plays a significant role in the magnetic properties when the particles are less than about 35 nm in size and consolidated to greater than about 90% density.

In the above examples, thick magnetic/insulator nanocomposite films have been described. The thick films comprise magnetic nanoparticles embedded in an insulating material. Without being bound by theory, it is believed that the intergrain interaction between neighboring magnetic nanoparticles separated by the insulating phase provides the desired magnetic properties, while the insulating material provides the desirable high resistivity, which significantly reduces the eddy current loss. The resulting materials exhibit reduced core loss.

All ranges disclosed herein are inclusive and combinable. While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A thick magnetic/insulator film comprising magnetic particles, wherein each magnetic particle is surrounded by an insulating layer, wherein the magnetic particles have grain sizes with average dimensions of about 1 to 100 nanometers, and wherein the thick film has a thickness of about 10 micrometers to about 3 millimeters.

2. The thick film of claim 1, wherein the thick film has a thickness of about 10 micrometers to about 1 millimeter.

3. The thick film of claim 1, wherein the magnetic particles are separated by about 0.5 nanometers to about 100 nanometers.

4. The thick film of claim 1, wherein the thick film has soft magnetic properties.

5. The thick film of claim 1, wherein the thick film has hard magnetic properties.

6. The thick film of claim 1, wherein the magnetic particles comprise a magnetic component selected from the group consisting of transition metals, Fe, Co, Ni, Mn, transition metal intermetallic alloys, Fe—Ni, Fe—Co, Co—Ni, Fe—B, Fe—N, Fe—Zr, Fe—Si, Fe—Si—B, Fe—Zr—B, Fe—P—B, Mn—Zn, Ni—Zn, transition metal-rare earth alloys, Fe—Nb, Fe—Sm, or a combination of one or more of the foregoing metals.

7. The thick film of claim 6, wherein the magnetic particles comprise Ni—Zn.

8. The thick film of claim 1, wherein the insulating layer comprises a ceramic or a polymeric material.

9. The thick film of claim 8, wherein the insulating layer comprises silica.

10. The thick film of claim 1, wherein the insulating layer comprises a ferrite.

11. A method of forming a thick film, comprising:
agglomerating magnetic particles, having grain sizes with average dimensions of about 1 to about 100 nanometers, and an insulating component to form an agglomerated feedstock; and
spraying the agglomerated feedstock onto a substrate to form the thick film having a thickness of about 1 micrometer to about 3 millimeters.

12. The method of claim 11, wherein agglomerating comprises:
dispersing the magnetic particles and the insulating component into a liquid medium;
adding an organic binder to form a solution;
spray drying the solution to form the agglomerated magnetic particles; and
heating the agglomerated magnetic particles.

13. The method of claim 11, wherein the magnetic particles comprise a magnetic component selected from the group consisting of transition metals, Fe, Co, Ni, Mn, transition metal intermetallic alloys, Fe—Ni, Fe—Co, Co—Ni, Fe—B, Fe—N, Fe—Zr, Fe—Si, Fe—Si—B, Fe—Zr—B, Fe—P—B, Mn—Zn, Ni—Zn, transition metal-rare earth alloys, Fe—Nb, Fe—Sm, or a combination of one or more of the foregoing metals.

14. The method of claim 11, wherein the insulating component comprises a ceramic, a polymer, a ferrite, or a combination comprising one or more of the foregoing insulating components.

15. The method of claim 11, further comprising consolidating the thick film.

16. The method of claim 15, wherein consolidating comprises:
degassing a chamber in which the thick film is to be treated;
reducing a surface oxide on the thick film;
hot pressing the thick film; and
slow cooling the thick film.

17. A method of forming a thick magnetic/insulator film, comprising:
preparing a precursor solution comprising a magnetic material precursor and an insulating material precursor;
delivering the precursor solution to a substrate using a solution delivery system; and
converting the precursor solution to a thick film, wherein the thick film comprises magnetic particles having average dimensions of about 1 nanometer to about 100 nanometers, and wherein the thick film has a thickness of about 50 micrometers to about 3 millimeters.

18. The method of claim 17, wherein the magnetic particles comprise a magnetic component selected from the group consisting of transition metals, Fe, Co, Ni, Mn, transition metal intermetallic alloys, Fe—Ni, Fe—Co, Co—Ni, Fe—B, Fe—N, Fe—Zr, Fe—Si, Fe—Si—B, Fe—Zr—B, Fe—P—B, Mn—Zn, Ni—Zn, transition metal-rare earth alloys, Fe—Nb, Fe—Sm, or a combination of one or more of the foregoing metals.

19. The method of claim 17, wherein the insulating component comprises a ceramic, a polymer, a ferrite, or a combination comprising one or more of the foregoing insulating components.

20. The method of claim 17, further comprising consolidating the thick film.

21. The method of claim 20, wherein consolidating comprises:
degassing a chamber in which the thick film is to be treated;
reducing a surface oxide on the thick film;
hot pressing the thick film; and
slow cooling the thick film.

22. The thick film of claim 1, as a component in power transformers, pulse transformers, filters, and chocks, inductors and linear transformers, linear applications, microwave antennae, rectennae, circulators, as magnetic fluids and in refrigeration applications.

23. A three component nanocomposite comprising coated magnetic particles embedded in a matrix, wherein the magnetic particles are coated with a substantially continuous coating having an average thickness of less than or equal to about 35 nanometers, and wherein the magnetic particles have grain sizes with average dimensions of about 1 to 100 nanometers.

24. The nanocomposite of claim 23, wherein the matrix comprises a magnetic material.

25. The nanocomposite of claim 23, wherein the matrix comprises an insulating material.

26. The nanocomposite of claim 23, in the form of a bulk material or a thick film.

27. The thick magnetic/insulator film of claim 1, wherein the thick film is a free-standing film without a substrate.

28. The thick magnetic/insulator film of claim 1, wherein the nanocomposite is used in a power transformer, pulse transformer, filter, chock, inductor, linear transformer, antenna, rectenna, circulator, magnetic fluid, or refrigeration application.

29. A soft magnetic metal/insulator nanostructured composite, comprising magnetic particles having maximum dimensions of about 1 to about 100 nanometers embedded in an insulating material, wherein a magnetic particle-magnetic particle separation is about 0.5 nanometers to about 100 nanometers.

* * * * *